(12) United States Patent
Lawlor

(10) Patent No.: US 8,260,634 B1
(45) Date of Patent: Sep. 4, 2012

(54) AUTOMATED INSURANCE CLAIM PRIMACY RESOLUTION AND CLAIM RESOLUTION

(76) Inventor: Patrick M. Lawlor, Venice, FL (US)

(*) Notice: Subject to any disclaimer, the term of this patent is extended or adjusted under 35 U.S.C. 154(b) by 0 days.

(21) Appl. No.: 12/152,853

(22) Filed: May 16, 2008

Related U.S. Application Data

(60) Provisional application No. 60/938,449, filed on May 16, 2007.

(51) Int. Cl.
 *G06Q 10/00* (2006.01)
 *G06Q 50/00* (2006.01)
(52) U.S. Cl. ................................. 705/2; 705/3
(58) Field of Classification Search ............. 705/2, 3, 705/4
 See application file for complete search history.

(56) References Cited

U.S. PATENT DOCUMENTS

| | | | |
|---|---|---|---|
| 6,343,271 B1* | 1/2002 | Peterson et al. | 705/4 |
| 2003/0028404 A1* | 2/2003 | Herron et al. | 705/4 |
| 2004/0205664 A1* | 10/2004 | Prendergast | 715/530 |

* cited by examiner

*Primary Examiner* — Gerald J. O'Connor
*Assistant Examiner* — Neha Patel
(74) *Attorney, Agent, or Firm* — Gifford, Krass, Sprinkle, Anderson & Citkowski, P.C.

(57) ABSTRACT

Comprehensive claim primacy among all insurers serving a given population is determined quickly and efficiently while not requiring all 4,500 or so insurers (in the U.S.) to unanimously adopt a new system of claim processing cooperation. The claim primacy determination is made by a centralized server with access to health plan enrollment and benefit data from substantially all insurers. The determination can therefore be comprehensive. Efficiency is achieved by caching enrollment and benefit data by the server, requiring periodic updates of the cached data by health plans. Unanimous lock-step adoption by the insurers is avoided by combining a standardized electronic messaging system to query data not cached in the server.

4 Claims, 43 Drawing Sheets

| FIG. 18M | FIG. 18N |
|---|---|
| FIG. 18K | FIG. 18L |
| FIG. 18I | FIG. 18J |
| FIG. 18G | FIG. 18H |
| FIG. 18D | FIG. 18E | FIG. 18F |
| FIG. 18A | FIG. 18B | FIG. 18C |

FIGURE 18

| ANSI 270; EB02, ANSI 271; EQ_03 | MISSING COVERAGE STATUS | COMMERCIAL ACTIVE EMPLOYEE | COMMERCIAL ACTIVE EMPLOYEE, GRP <100 | COMMERCIAL ACTIVE EMPLOYEE, GRP >100 | COMMERCIAL ACTIVE EMPLOYEE, GROUP >100 | COMMERCIAL ACTIVE EMPLOYEE, GROUP UNDER 20 LIVES |
|---|---|---|---|---|---|---|
| MISSING COVERAGE STATUS | Unresolveable | Unresolveable | Unresolveable | Unresolveable | Unresolveable | Unresolveable |
| COMMERCIAL ACTIVE EMPLOYEE | Unresolveable | R5/R6 | R5/R6 | R5/R6 | R5/R6 | R5/R6 |
| COMMERCIAL ACTIVE EMPLOYEE, GRP <100 | Unresolveable | R5/R6 | R5/R6 | R5/R6 | R5/R6 | R5/R7 |
| COMMERCIAL ACTIVE EMPLOYEE, GRP >100 | Unresolveable | R5/R6 | R5/R6 | R5/R6 | R5/R6 | R5/R8 |
| COMMERCIAL ACTIVE EMPLOYEE GROUP <20 | Unresolveable | R5/R6 | R5/R6 | R5/R6 | R5/R6 | R5/R8 |
| COMMERCIAL ACTIVE EMPLOYEE GROUP >20 | Unresolveable | R5/R6 | R5/R6 | R5/R6 | R5/R6 | R5/R6 |
| COBRA EMPLOYEE | Unresolveable | X | X | X | X | X |
| RETIRED EMPLOYEE | Unresolveable | R5/R6 | R5/R7 | R5/R8 | X | Y |
| STUDENT PLAN | Unresolveable | X | X | X | X | Y |
| MEDICARE OVER 65 | Unresolveable | X | X | X | X | Y |
| MEDICARE SPOUSE | Unresolveable | X | X | X | X | Y |
| MEDICARE CHILD | Unresolveable | X | X | X | X | Y |
| MEDICAID INSURED ADULT | Unresolveable | X | X | X | X | X |
| MEDICAID SPOUSE | Unresolveable | X | X | X | X | X |
| MEDICAID CHILD | Unresolveable | X | X | X | X | X |
| SPOUSE | Unresolveable | X | X | X | X | X |
| COMMERCIAL SPOUSE, GRP <20 | Unresolveable | X | X | X | X | X |
| COMMERCIAL SPOUSE, GRP >20 | Unresolveable | X | X | X | X | X |
| COMMERCIAL SPOUSE GRP <100 | Unresolveable | X | X | X | X | X |
| COMMERCIAL SPOUSE, GRP >100 | Unresolveable | X | X | X | X | X |
| COBRA SPOUSE | Unresolveable | X | X | X | X | X |
| RETIREE'S SPOUSE | Unresolveable | X | X | X | X | X |

FIGURE 18A

| ANSI 270; EB02 ANSI 271: EQ D3 | MISSING COVERAGE STATUS | COMMERCIAL ACTIVE EMPLOYEE | COMMERCIAL ACTIVE EMPLOYEE, GRP <100 | COMMERCIAL ACTIVE EMPLOYEE, GRP >100 | COMMERCIAL ACTIVE EMPLOYEE, GROUP UNDER 20 LIVES |
|---|---|---|---|---|---|
| COMMERCIAL CHILD | Unresolveable | X | X | X | X |
| COMMERCIAL CHILD, GRP < 20 | Unresolveable | X | X | X | X |
| COMMERCIAL CHILD, GRP > 20 | Unresolveable | X | X | X | X |
| COMMERCIAL CHILD, GRP < 100 | Unresolveable | X | X | X | X |
| COMMERCIAL CHILD, GRP > 100 | Unresolveable | X | X | X | X |
| COMMERCIAL CHILD CUSTODIAL PARENT | Unresolveable | X | X | X | X |
| COMMERCIAL CHILD SPOUSE OF CUSTODIAL PARENT | Unresolveable | X | X | X | X |
| COMMERCIAL CHILD NON-CUSTODIAL PARENT | Unresolveable | X | X | X | X |
| RETREE'S CHILD | Unresolveable | X | X | X | X |
| TRICARE EMPLOYEE | Unresolveable | | | | |
| TRICARE SPOUSE | Unresolveable | X | X | X | X |
| TRICARE CHILD | Unresolveable | X | X | X | X |
| BLACK LUNG DIAGNOSIS | Unresolveable | | | | |
| VETERANS ADMINISTRATION | Unresolveable | X | X | X | X |
|  | Unresolveable | Rule Source | Rule Source | Rule Source | Rule Source |

ANSI Standards
INS02  1     Spouse
INS02  19    Child
INS03  34    Other Adult

FIGURE 18B

| | MISSING COVERAGE STATUS | COMMERCIAL ACTIVE EMPLOYEE | COMMERCIAL ACTIVE EMPLOYEE, GRP <100 | COMMERCIAL ACTIVE EMPLOYEE, GRP >100 | COMMERCIAL ACTIVE EMPLOYEE, GROUP UNDER 20 LIVES |
|---|---|---|---|---|---|
| ANSI 270: EB02, ANSI 271: EQ D3 | | | | | |
| INS07 | | | COBRA | | |
| 270: EB02 ; 271: EOD3 | | CO | children only | | |
| 270: EB02 ; 271: EOD3 | | CHD | COMMERCIALs Only | | |
| 270: EB02 ; 271: EOD3 | | DEP | Employee and Children | | |
| 270: EB02 ; 271: EOD3 | | ECH | Employee Only | | |
| 270: EB02 ; 271: EOD3 | | EMP | Employee and Spouse | | |
| 270: EB02 ; 271: EOD3 | | ESP | Family | | |
| 270: EB02 ; 271: EOD3 | | FAM | Individual | | |
| 270: EB02 ; 271: EOD3 | | IND | Spouse and Children | | |
| 270: EB02 ; 271: EOD3 | | SPC | Spouse Only | | |
| 270:EQD4 ; 271: EB 04 | | SPO | COBRA | | |
| 271 DTP 01 | | CO | COBRA Begin | | |
| 271 DTO 01 | | 340 | COBRA End | | |
| | | 341 | | | |
| Rule 5: Plan with earlier date of coverage is primary | | | | | |
| ANSI 270 | | | | | |
| ANSI 271 | | | | | |
| A = Message to customer. Medicare covers this person. Insufficient detail to resolve primacy. Please call Medicare | | | | | |
| NA = Impossible situation. You can't be an insured over 65 and a child under commercial insurance, which terminates in all cases at age 2 | | | | | |

| COMMERCIAL ACTIVE EMPLOYEE, GROUP OVER 20 LIVES | COBRA EMPLOYEE | RETIRED EMPLOYEE | STUDENT PLAN | MEDICARE OVER 65 | MEDICARE DISABLED PERSON | MEDICARE SPOUSE | MEDICARE CHILD |
|---|---|---|---|---|---|---|---|

Pink: COBRA
Green: TriCare
Blue: CMS

| MEDICAID INSURED ADULT | MEDICAID SPOUSE | MEDICAID CHILD | SPOUSE | Commercial Spouse, Group <20 | Commercial Spouse, Group >20 | COMMERCIAL SPOUSE, GRP < 100 | COMMERCIAL SPOUSE, GRP > 100 |
|---|---|---|---|---|---|---|---|
| Y | Y | Y | R5/R6 | R5/R6 | R5/R6 | R5/R6 | R5/R6 |
| Y | Y | Y | R5/R6 | R5/R6 | R5/R6 | R5/R6 | R5/R6 |
| Y | Y | Y | R5/R6 | R5/R6 | R5/R6 | R5/R6 | R5/R6 |
| Y | Y | Y | R5/R6 | R5/R6 | R5/R6 | R5/R6 | R5/R6 |
| Y | Y | Y | R5/R6 | R5/R6 | R5/R6 | R5/R6 | R5/R6 |
| Y | Y | Y | R5/R6 | R5/R6 | R5/R6 | R5/R6 | R5/R6 |
| Y | Y | Y | R5/R6 | R5/R6 | R5/R6 | R5/R6 | R5/R6 |
| Y | Y | Y | | | | | |
| Y | Y | Y | X | X | X | X | X |
| Y | Y | Y | X | X | X | X | X |
| Y | Y | Y | X | X | X | X | X |
| Y | Y | Y | X | X | X | X | X |
| Y | Y | Y | X | X | X | X | X |

Registration Login

The following login information was included in our letter to HR (for Plan Sponsors) or your HIPAA Office. If you do not hve this information, please contact us.

TPIN: ☐
Username: ☐ —2002
Password: ☐ —2004

[Next] —2006

FIGURE 20

Company Information

* Name of Company: ⬚ —2102
* Home Office Zip Code: ⬚ —2104
Your Assigned TPIN: tpin
Would you like to change your Username? ☐ —2106
Would you like to change your Password? ☐ —2108
* Company Contact: ⬚ —2110
* Company Contact Telephone Number: ⬚ —2112
* Company Contact E-Mail: ⬚ —2114
(* denotes required fields)

[ Next ] —2116

FIGURE 21

Submitting Your Data

There are four means of complying with this audit:

1. You can reply to ANSI 270 messages, directly or by instructing a clearing house or your TPA to relay messages. Your internal costs of replying to these message is your own expense.
2. You can upload your enrollment data (ANSI 834) from June 1, 2004 through December 31, 2005 to our servers to avoid the message load, and our servers will store and process these queries for you. The fee for this option covers the cost of storage and processing and is set at $0.02 per eligibility record in storage.
3. You can upload your enrollment data, and participate in the audit process by authorizing the measurement of your own primacy oversights.
4. For Plan Sponsors: If you use a Clearinghouse/TPA/Payer there is a registration page to fill out and a letter to send the Clearinghouse/TPA/Payer on your behalf to open up the gateway for you.

Please indicate your choice among these options:

○ 1. We will response to ANSI 270 messages ——— 2202
directly

● 2. We will upload out enrollment data and pay ——— 2204
the cost of storage and processing ○ 3. We will upload our data and request our own ——— 2206
primacy audit ○ 4. We will instruct our Clearinghouse to
receive and forward ANSI 270's as a participating
Payer

[Previous] [Next]
                                         2208

FIGURE 22

To Receive ANSI 270's

We will send you information to check eligibility by 270, please provide the following information:

VPN Access Information
- \* VPN IP Address: ⎯⎯⎯⎯ 2302
- \* VPN Username: ⎯⎯⎯⎯ 2304
- \* VPN Password: ⎯⎯⎯⎯ 2306

Please provide us with your Companion Document for ANSI format details. Cli here to attach a copy of your EDI Companion Document or to include a li this document.

Contact Point
- \* Name: ⎯⎯⎯⎯ 2308
- \* Telephone Number: ⎯⎯⎯⎯ 2310
- \* E-Mail: ⎯⎯⎯⎯ 2312
- \* Verify E-Mail:

(\* denotes required fields)

[Previous] [Next] ⎯⎯ 2314

FIGURE 23

Choice 2: Upload Eligibility Data for Storage

In lieu of responses to our eligibility queries, Digital Healthcare, Inc. will accept the upload of a complete eligibility record from June 1, 2004 through December 31, 2005, in ANSI 834 format.

To accomplish compliance in this way, please download and fax the following agreement:

- Click here to download the Data Storage Agreement — 2402

Once completed, click next to setup the SSL interface for he initial upload and maintenance of your census data.

For ANSI 834 formatting information, click here to download the Digital Healthcare Companion Document.

Setup SSL Interface

To access the SSL
Interface

Username: [_____] —2502

Password: [_____] —2504

Contact point for testing

* Name: [_____] —2506

* Telephone Number: [_____] —2508

* E-Mail: [_____] —2510

(* denotes required fields)

[ Previous ]  [ Next ]
           —2512

AUTOMATED INSURANCE CLAIM PRIMACY RESOLUTION AND CLAIM RESOLUTION

FIELD OF THE INVENTION

This invention relates to the field of computer-related insurance administration, and, in particular, to a comprehensive system of health insurance primacy resolution and initial claim resolution.

BACKGROUND

Healthcare costs are on a track which can not be supported by the American economy. A significant and immediate reversal is vitally important to the country.

Much of the reason for the discouraging cost prognosis of health care is the complex, highly fragmented nature of the health care industry with thousands of diverse, competitive players.

As states, and later Medicare, run out of cash to fund claims, one solution is to curtail spending is rationing based on the resource basis of the insured. Healthcare reform in several jurisdictions, notably Massachusetts in 2006, provides for scaled assistance to the working poor.

But how are the present health care systems to do even this? Both supporters and reformers of the existing systems presume, deus ex machina, that the current enrollment and means-testing processes have a method of comparing a person's identity to his other sources of insurance, his employment or gross or net income, or of tracking those important statutory and budgetary facts after enrollment has occurred or changed. Yet, in reality, such "perfect knowledge" regarding the precise state of each of the hundreds of millions of insureds remains elusive.

Similarly, Medicare Part D, the current pharmacy plan for America's elderly, wrongly presumes that Medicare's fiscal intermediaries have access to information regarding when a patient reaches the limit of incurred pharmacy expenses to begin, end, and recommence Federal support. With no existing access to information on these billed expenses, Medicare Part D is set to become the nation's second greatest fraud on the taxpayer since Medicaid.

Other problems include some business practices so egregious that reformers felt compelled to address them with legislation, but which, too often, have been a challenge to enforce. For example, Prompt-Pay statutes have been adopted in many jurisdictions to discourage the practice among health plans of propping up their stock prices by delaying timely payment to medical providers. However, tracking the compliance of health plans with prompt-pay law is massively time consuming in a manual business process, and so in fact is rarely done.

Nor has the industry avoided complaints of fraud. In 2002, Blue Cross was prosecuted under Federal Racketeering law for systematically paying less than their contracts with providers stipulated. The racketeering case was eventually settled, but in light of the difficulty of comparing hundreds of thousands of remittance accounts on tens of thousands of billing codes to hundreds of contracts potentially covering thousands of payers, medical providers can not currently be sure that they are paid properly.

With such a huge volume of medical records stored in scores of separate, non-standardized, and often differently structured and maintained corporate files, legislation has had little impact on the performance of industry practices. HIPAA 1171-1176 or similar state law adopted under the Deficit Reduction Act of 2005, require health plans to, at a minimum, respond to eligibility inquiries and claim filing messages sent on behalf of medical providers or other health plans, notably Medicaid, Medicare, the Veterans Administration, and Tricare (medical care for active-duty military and dependents). Yet there is no access to comprehensive enrollment data of insurance and claims distributed among thousands of insurers and millions of sponsors and insureds to facilitate the required billions of queries.

At the heart of such problems, a continuing fundamental and very costly issue for the health insurance industry is the difficulty of determining which of two or more of a person's health insurance providers is primarily responsible for a medical bill. Determining the correct primary and secondary payers is commonly referred to as the primacy problem. A very recent GAO report (GAO 06-862) estimates that losses to Medicaid from the primacy problem alone exceed $60 billion per year, from the systematic avoidance of claims by the for-profit insurance industry, merely from the lack of a centralized, pre-emptive means of determining primacy.

Primacy determinations by individual carriers, while theoretically possible, leads to conflict of rules, impossible outcomes, and such failures in primacy determination nullify any benefits reaped by any electronic processes designed to speed e-commerce and thereby constrain the growth of overhead in health care.

In today's health care market, the Medicaid authorities cited by the GAO for wasting 13% of the cash in their programs to primacy errors have retained vendors to resolve this problem for twenty years. They expend millions of dollars of taxpayers' assets trying to collect claim payment errors of this specific type. Paid on contingency, these vendors typically abandon all but the largest claims, and so recover less than 1% of paid claims, while in the GAO study mentioned above, 13% of beneficiaries said they had private (therefore primary) coverage.

It seems clear that primacy is not a trivial problem, yet existing practices are widely recognized to be incapable of dealing with it. In a market of 4,500 commercial health insurance payers, tens of millions of corporate health plan sponsors and an estimated 10 million enrollment changes per month, primacy determination systems described or constructed to date are, according to the affidavits of experts in the trade, insufficient to accurately determine primary and secondary payers for medical costs incurred by any of 300 million persons on an ongoing basis (i.e., not with merely a snapshot of enrollment data but able to determine primacy at a rate at least that of the rate of eligibility inquiries and claims).

This is a long-felt problem in the industry. In 1993, the Workgroup on Electronic Data Interchange allocated a task group to study this problem in the run-up to the Health Insurance Portability and Accountability Act of 1996 (HIPAA). That task group found that the only economically practical way of resolving primacy was the formation of a central directory to resolve all insurances for a given patient-day. Likewise, the Office of Management in Budget testified to the Senate Finance Committee in 1995 that they envisioned an on-line, up-front query system to preempt these errors. Whether because of lack of ownership or the technical difficulties in bringing these general concepts to the market, the problem remains throughout US health care finance fifteen years later.

The magnitude of these unlawful cost transfers has large social utility: $100 billion in defalcation against government health plans implies assets sufficient to insure 20 million uninsured people in the US. Likewise, because government is the payer of last resort in most cases, the government pays a fraction of the costs of care while commercial insurers pay 150% of the costs of care on average, meaning that while the taxpayer and the uninsured are deprived of $100 Billion per year, our medical providers are deprived of rightful income at a rate of about $300 Billion per year.

Often, as in Doyle (U.S. Pat. No. 4,961,611) and Tawil (U.S. Pat. No. 5,519,607), existing systems are intended to automate parts of the claim process for a single insurance company or third party administrator (TPA). Some address processes that are limited to one part of the health care finance sequence of processes, as Gottlieb (20040073456) describes a process to recover money after its been spent, possibly by systems such as Doyle's and Tawil's. These systems, fine as they may be, merely describe the limited automation of existing processes and do not address the non-trivial additional step of obtaining sufficiently comprehensive and accurate data to provide a comprehensive test of primacy.

None of the referenced art tells us from whence or by what means the enrollment data would be obtained that one would need to compare in order to derive the primacy of two payers insuring the same person. It seems that immense value would be conveyed by a system that resolves that problem. The prior art references, when they refer to primary and secondary payers, refer only to the incidental volunteering of other health care coverage information by patients that produces the nation's existing 4% coordination of benefits rate out of 20% double coverage that is estimated to exist.

Previous attempts to improve claim resolution appear to have assumed relatively small databases of enrollment data and don't evidence appreciation of, or answers to, inherent problems of very large databases. Chief among the problems of large databases is the problem of resolving false positives—occasions when multiple persons occur under the same identifiers. Identifying data of people, such as names, birth dates, birth places, spouse names, etc., is often not unique. Resolving ambiguous identification of persons requires the non-trivial step of recognizing the ambiguity in the first place. Systems without access for comprehensive enrollment data for substantially all insureds simply lack sufficient resources to recognize such identification ambiguity.

Conventional systems appear not to resolve these false positives. Identifying the wrong "John Smith" importantly corrodes the fiscal integrity of these systems by transferring medical costs to the wrong health plan. And the problem is enormous. There is a need to resolve primacy on a day-to-day basis for 300 million Americans, with considerable overlap to 20 million Canadian and 20 million Mexican insureds.

We have an American health care system that permits suspect business practices, stymies efforts to force compliance with government regulatory efforts and whose costs are increasingly insupportable. It is imperative that this downward spiral be arrested.

Therefore, the clarity and effectiveness of a new blueprint for this process, under current law and consistent with current business needs, is an immediate and vital national interest.

SUMMARY OF THE INVENTION

In accordance with the invention, comprehensive enrollment data for substantial all of the 4,500 or so insurers is made available in a manner that supports highly efficient comprehensive initial primacy resolution by obviating unanimous, lock-step adoption of enrollment data coordination by the thousands of diverse insurers. Each insurer has the option of continuing to respond to currently required, standardized, electronic queries or of storing complete enrollment data for the insurer at a centralized repository. Primacy resolution is then reduced to comparing information stored in a local database and using standard eligibility inquiry and claim messages for only those insurers who select to participate in that manner.

The automated insurance claim resolution system described herein makes possible a new degree of transparency, predictability and compliance within the health care industry, providing a means of real reform of an industry fraught with payment problems of such enormous and worrisome dimensions as to threaten the future viability of American health care.

The automated insurance claim resolution system efficiently produces of a standardized, contemporaneous record of all health insurance coverage possessed by an insured person as he begins the process of incurring a medical claim, and aggregates and centralizes that record so as to apply survivable rules of primacy, assuring correct and prompt payments and legal compliance, and makes the record easily accessible to authorized users in a timely, consistent fashion.

In accordance with the invention, a large computer system accessible by users of a health care industry network requires entry of standardized information on the insured and their policies; houses and integrates standardized, centralized, and perpetually updated enrollment and medical records and insurance policies; ranks primary and secondary coverage using exogenous legal rules, tracks contractual accuracy of claims and payments and of prompt payment conduct; and ensures compliance with the law. The System reduces costs (i) by achieving economies of scale, (ii) by eliminating the need for costly, repetitive systems under the Deficit Reduction Act (42 USC 1902(a)(25) and SCHIP Extension Act (42 USC 1395 y (b)), and (iii) by eliminating unnecessary procedures and manual processes. The System provides transparency, reduced bookkeeping, and reduced effort at fraud detection. The System includes multiple data centers in a large capacity, replicated system whose redundancy guards against loss and corruption, is accessible only by a duly-authorized group of health care industry authorized users, and provides a barrier to efforts to compromise health care data.

In accordance with the present invention, the System acts as a "clearinghouse" or "value added network", serving both medical providers (doctors, hospitals, pharmacies, etc.) and the health plans (Blue Cross, commercial health plans, third-party administrators, self-insured corporate plan sponsors, and government health plans) which bear the financial risk for the claims of the insured. The System also is a natural central repository for patient health data and for claims in transit—providing an index to medical care rendered, billing, treatment conflict, drug abuse and insurance fraud. The clearing house or value added network (VAN) provided by the System transmits the standard health care insurance transactions mandated by HIPAA 1171-1176

The System (i) applies logic whose rules reflect applicable regulations to settle primacy, (ii) continually updates enrollment data to ensure accuracy and completeness, and (iii) improves the accuracy of legal compliance and enforcement efforts.

The System also provides a credible biometric index of patients for biometric patient identification and authentication. Such greatly speeds identification of patients, reduces false positives, and obviates much of patient involvement in insurance claim processing. This is of particular value for severely injured or very ill patients.

The private network of the System can store health plan enrollment data and associate user interfaces for direct access to such enrollment data by the health plan. In doing so, the enrollment of the health plan stored by the System is the primary data and any copies thereof maintained by the health plan are secondary backup copies. The user interfaces in combination with the storage of enrollment data provides a complete, integrated health care insurance administration system for the insurer, obviating the need to provide and maintain such a system by the insurer. As the primary data, such enrollment data is necessarily always current and accurate. Having the enrollment data stored locally within the System facilitates comprehensive initial claim resolution by obviating standard eligibility inquiry and claim messages, reducing network traffic accordingly. This reduces costs by allowing the System's central server to handle transactions for all of North America with minimal manpower.

The System automates oversight of contracted payment amounts and prompt-pay laws, compares billing responses against bills, executes the delivery of claims to payers in the proper sequence of primacy, provides banking services internal to the system, and calculates receivables and bills the system's users.

The System reduces messaging volume to the extent enrollment data is stored by the System and speeds and improves primacy determination at reduced cost by eliminating manual processes and inappropriate or redundant claims.

Automated insurance claim resolution by the System involves logic that represents the current state of applicable law uses enrollment data stored by the system and also acquires additional enrollment data required to comprehensively and accurately determine primacy for an insurance claim. In addition, the System provides several layers of potential granularity in the determination of primary payers, from resolving primacy only by coverage status, to resolving primacy including the plan structure exclusions and limitations, thereby reducing the cost of plan structure rejections and the time value of delayed collections.

Automating the linkage of primacy determination, including supporting activities such as enrollment data acquisition, to active enforcement measures, usually by state or Federal government, has been found by experimentation to be vital to the success of comprehensive, accurate insurance claim primacy resolution. From the notes above, it should be clear that commercial payers seek to avoid claims, and have been observed to defy government attempts to audit for and resolve primacy. Even with legislation that requires prompt, severe penalties for non-compliant parties, a market with 4,500 payers, 20 million corporate plan sponsors, and 200,000 medical providers, and 6 billion medical claims per year will not provide a comprehensive primacy test unless the System identifies non-compliant parties and electronically commences the enforcement process. Reliable enforcement also adds utility by guaranteeing compliant parties a level competitive playing field.

Further utility is added by assuring that claims are routed to payers in the proper sequence of primacy, doing away with the practice of some medical providers of "shotgun billing", and the practice of redundant claim filings. This step thereby reduces the claim error and workload of all subscribing payers.

The system provides the sorely needed large-scale integration and industry-wide availability of automated, detailed, standardized and updated information necessary to verify the identity of the patient, establish payer primacy, limit bills to total coverage and to the appropriate payments from primary and secondary payers, help enforce compliance with legal regulations, track invoices and payments and help assure that contractual obligations are met.

BRIEF DESCRIPTION OF THE DRAWINGS

Figure 18D:
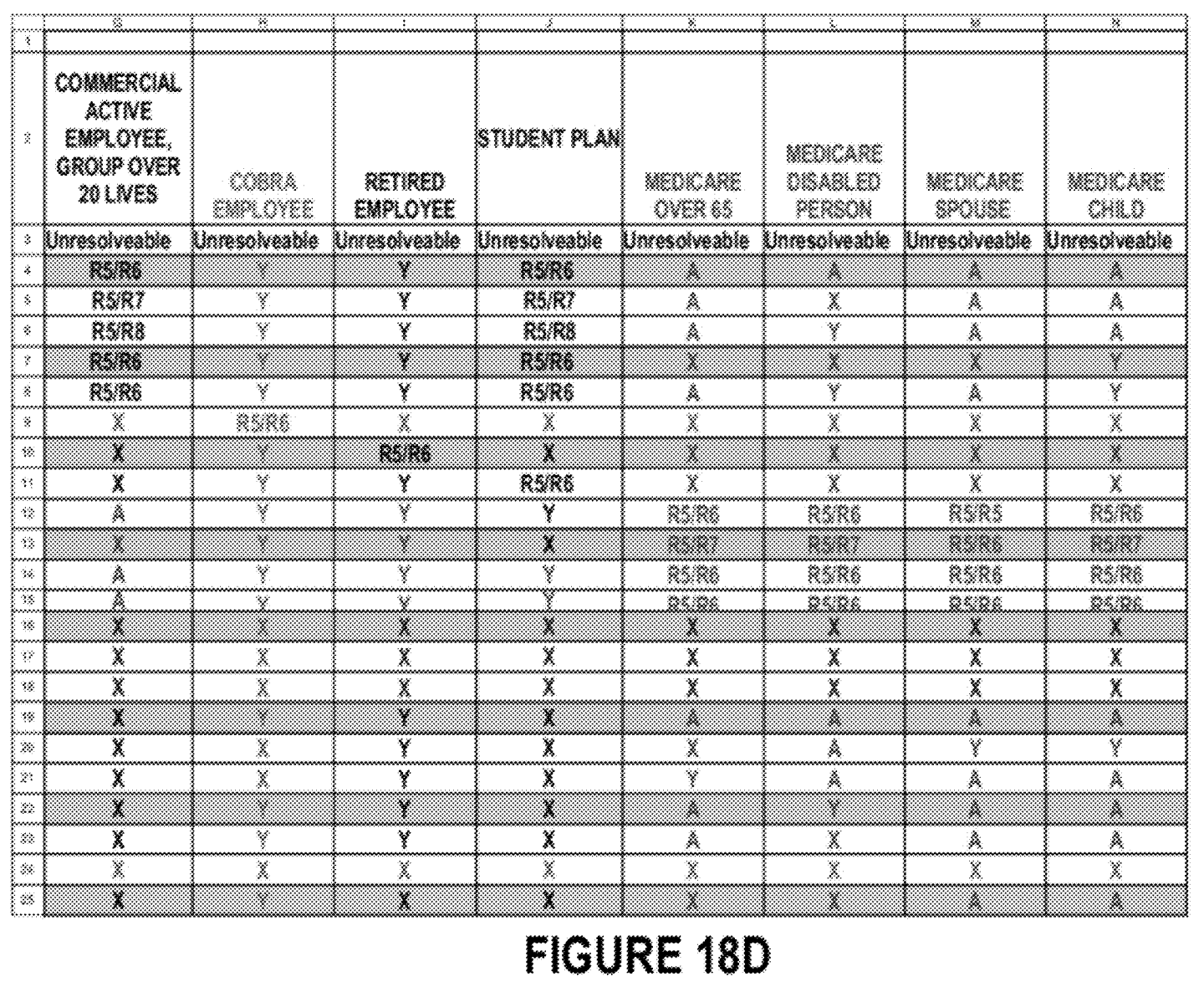
Figure 18E:
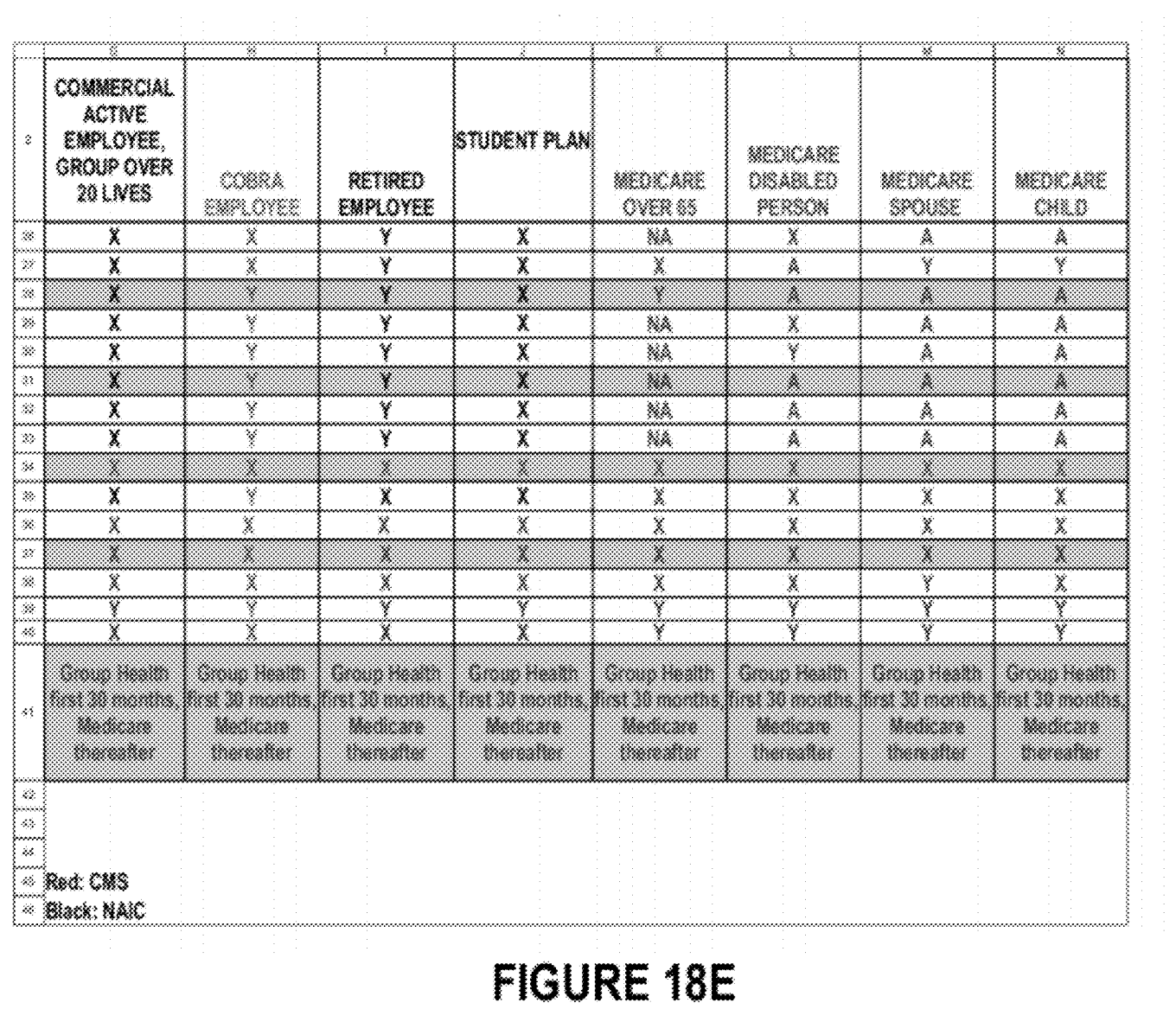
Figure 18G:
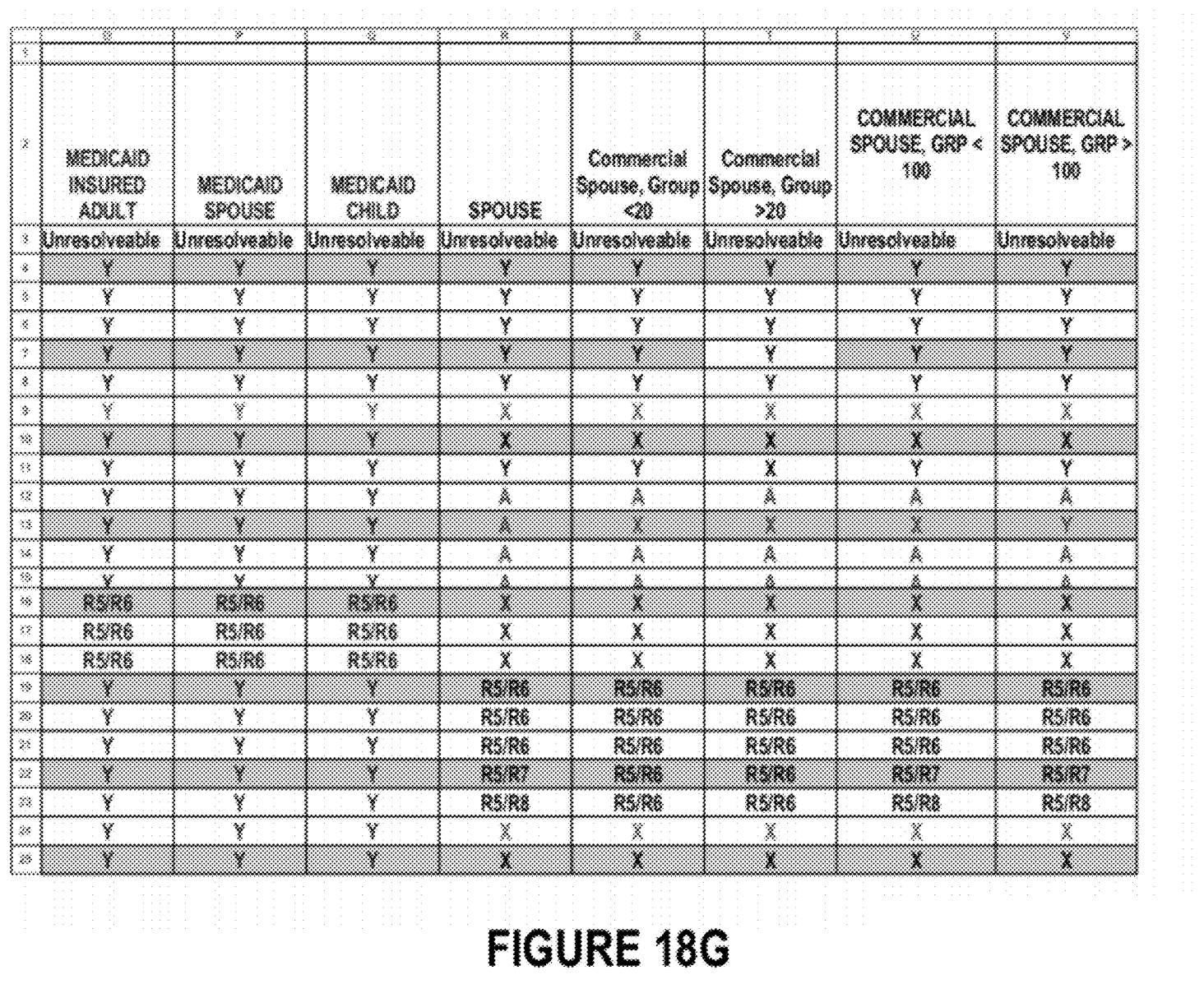
Figure 18I:
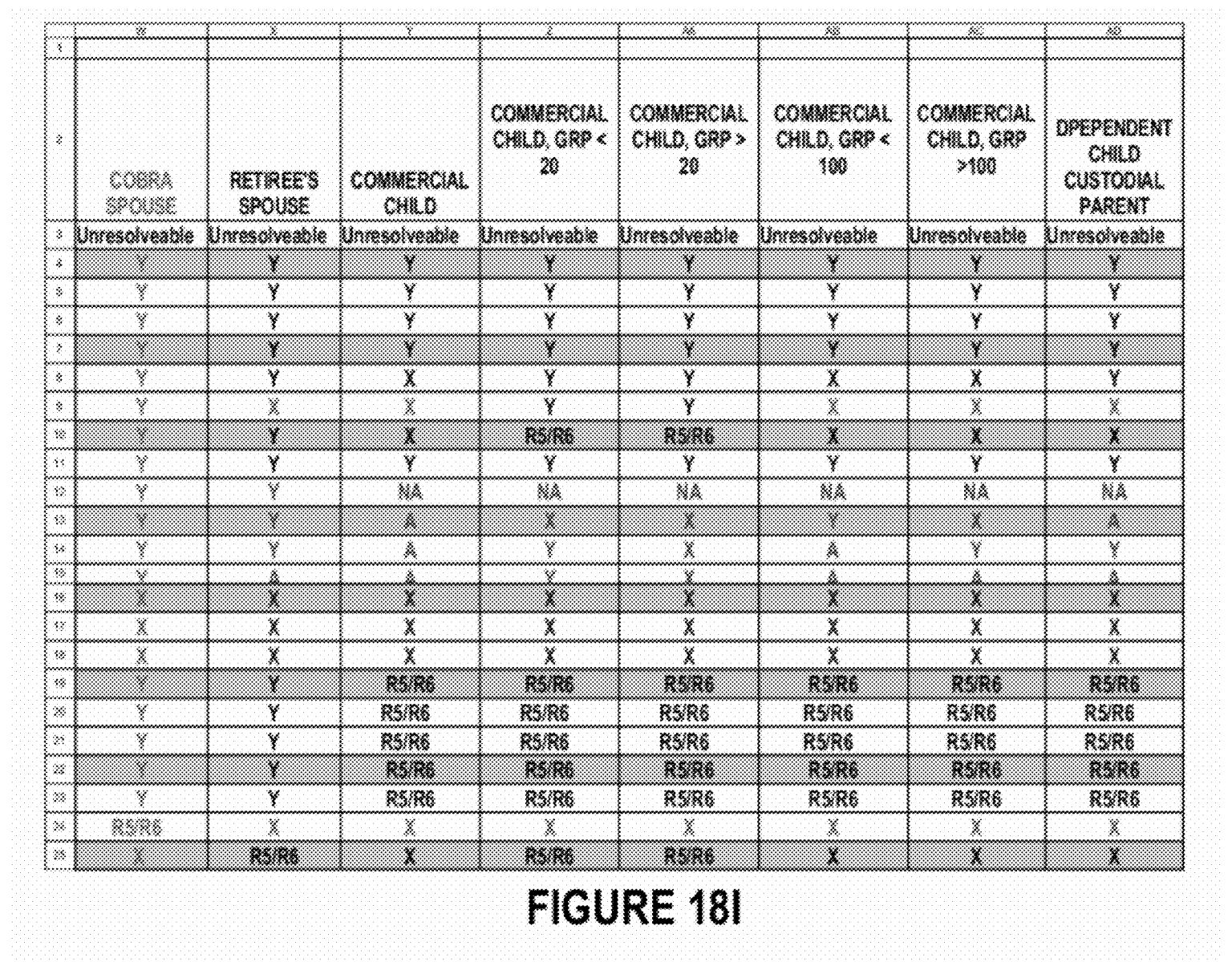
Figure 18J:
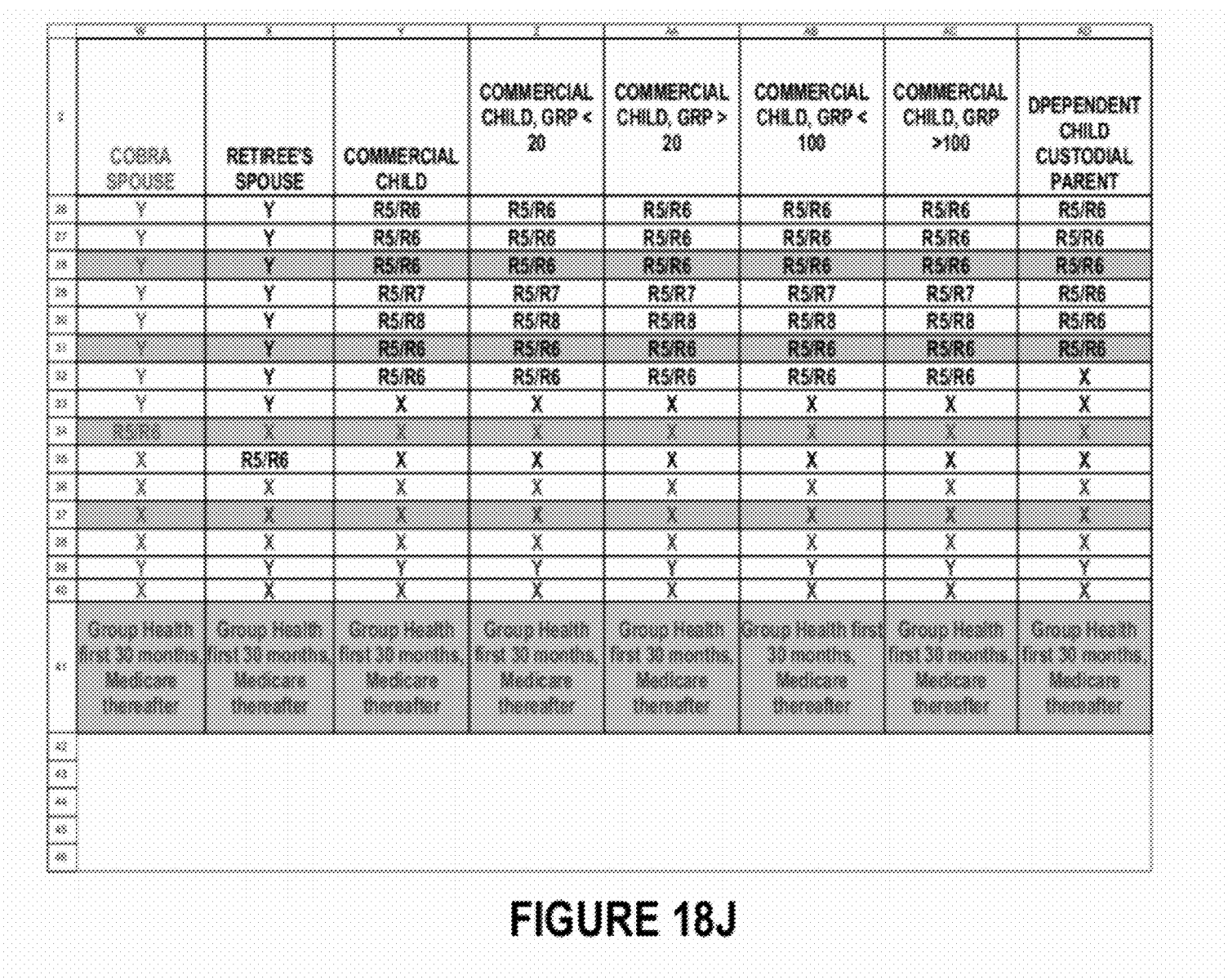
Figure 18K:
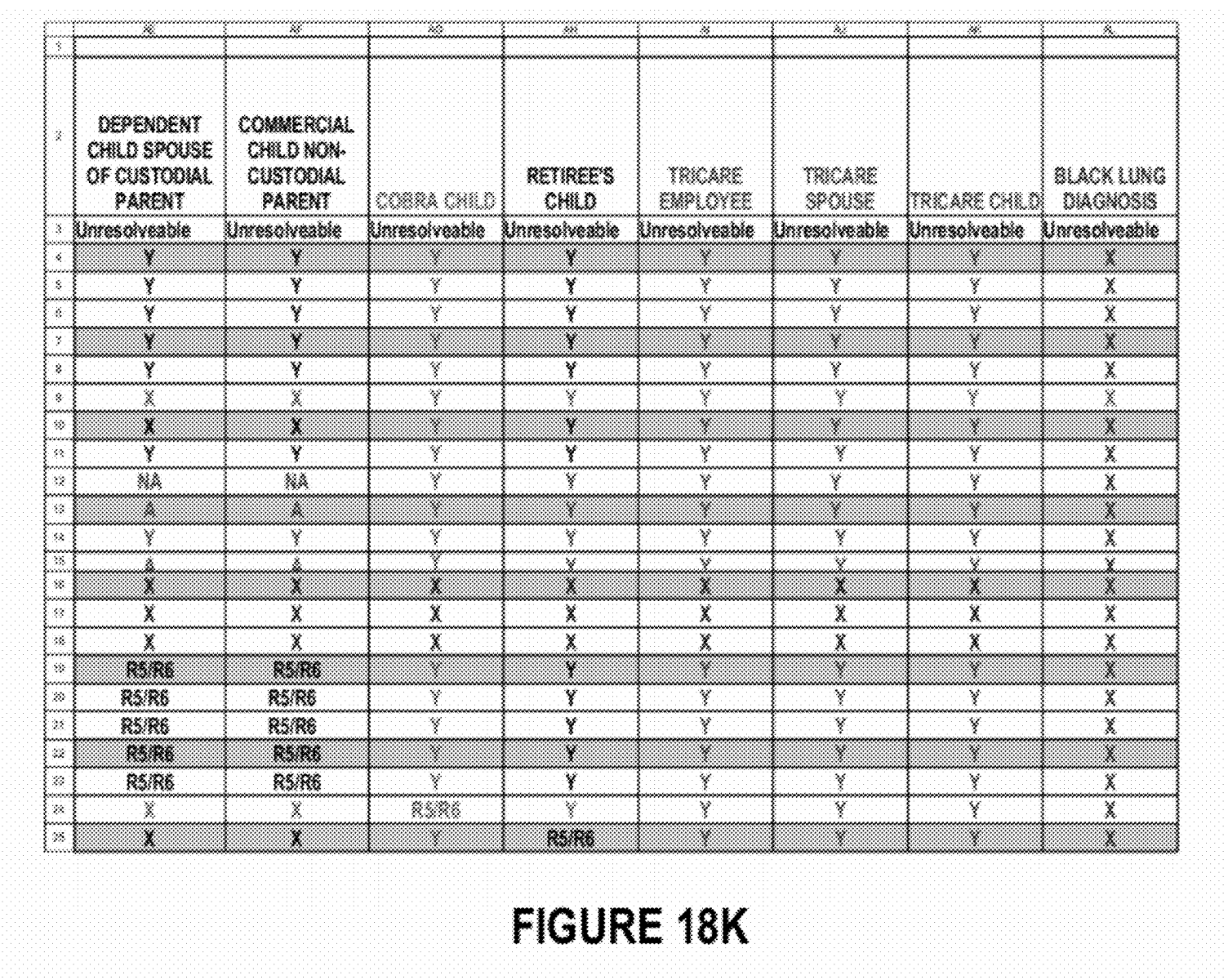
Figure 18L:
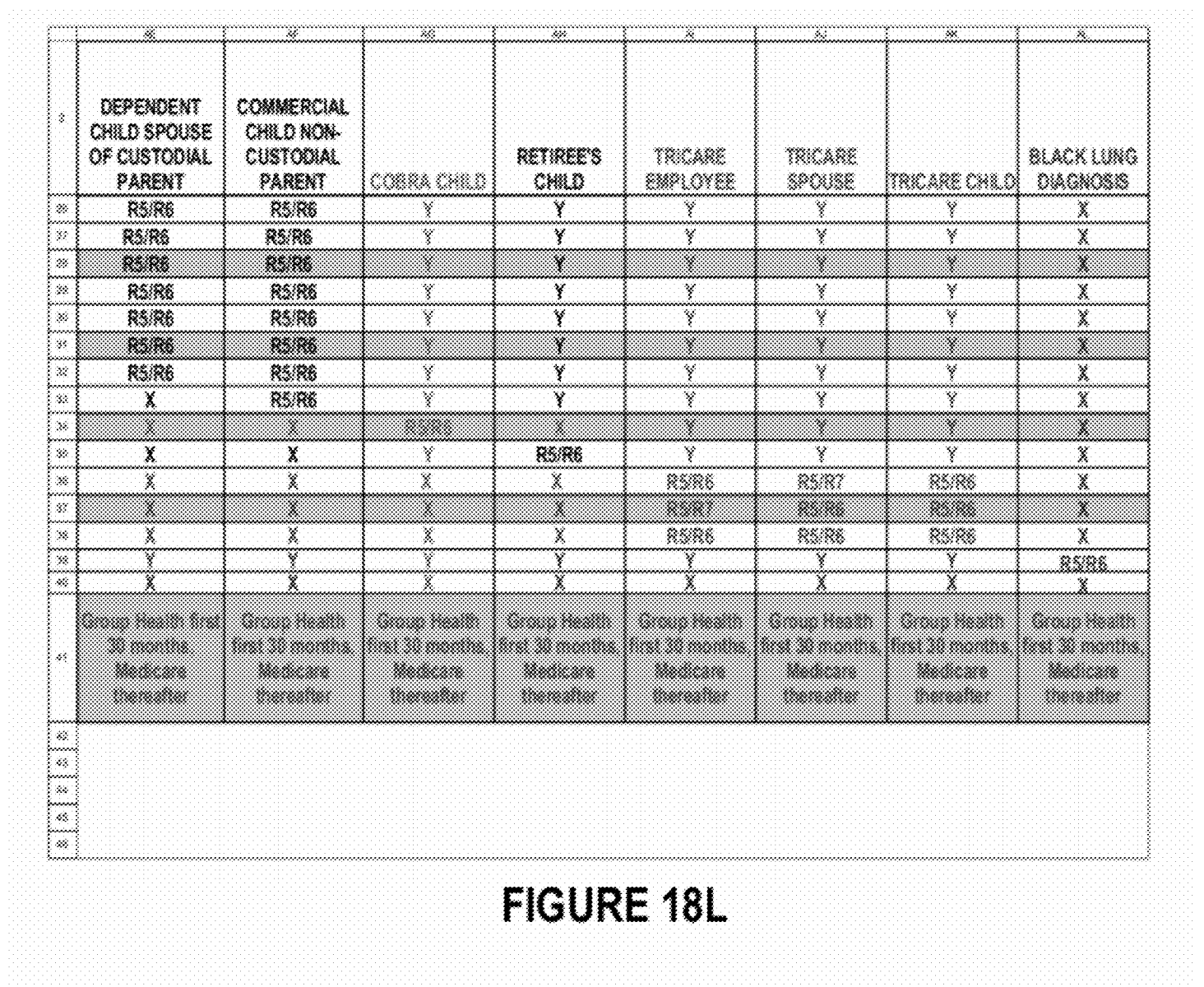
Figure 18M:
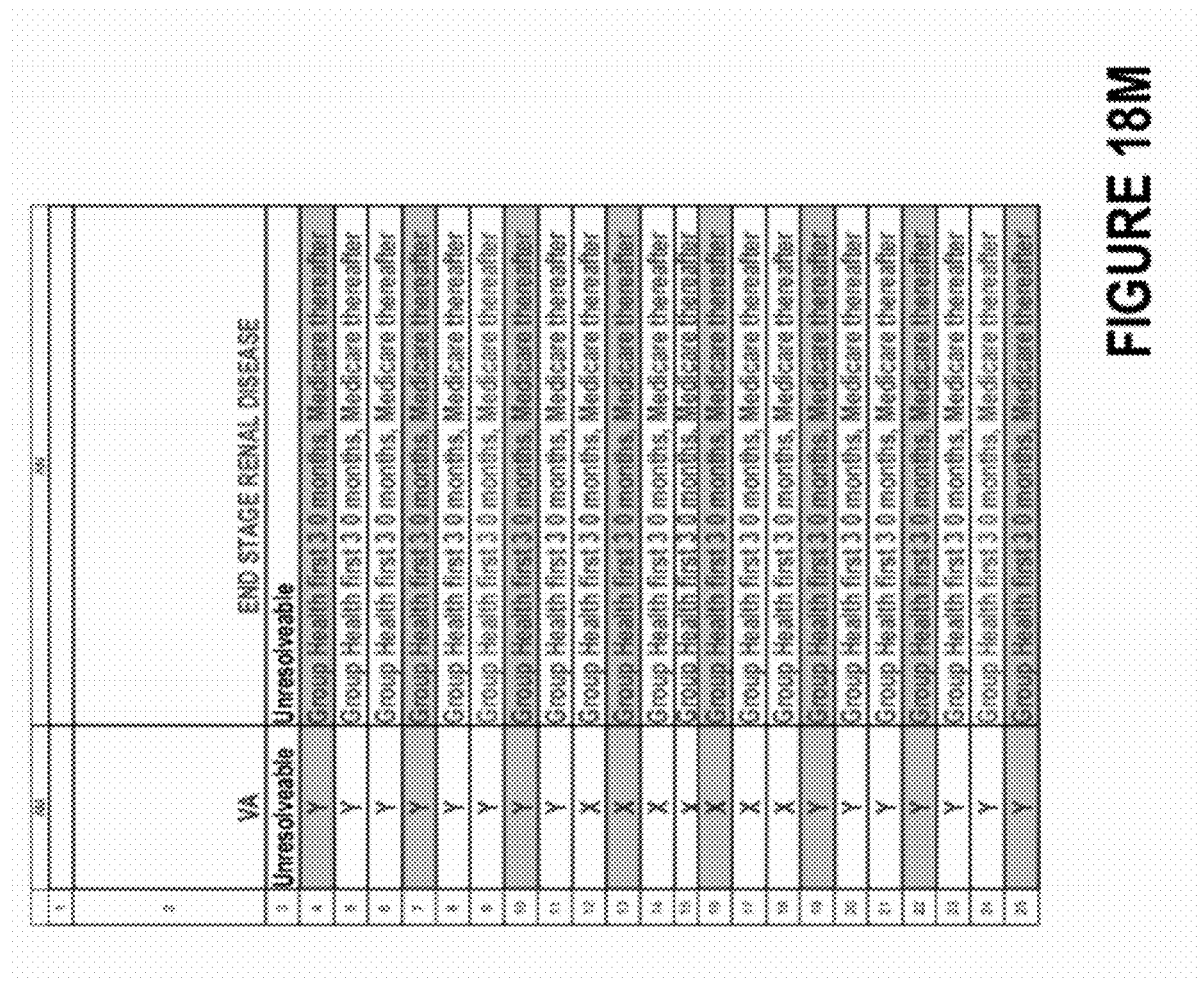
Figure 18N:
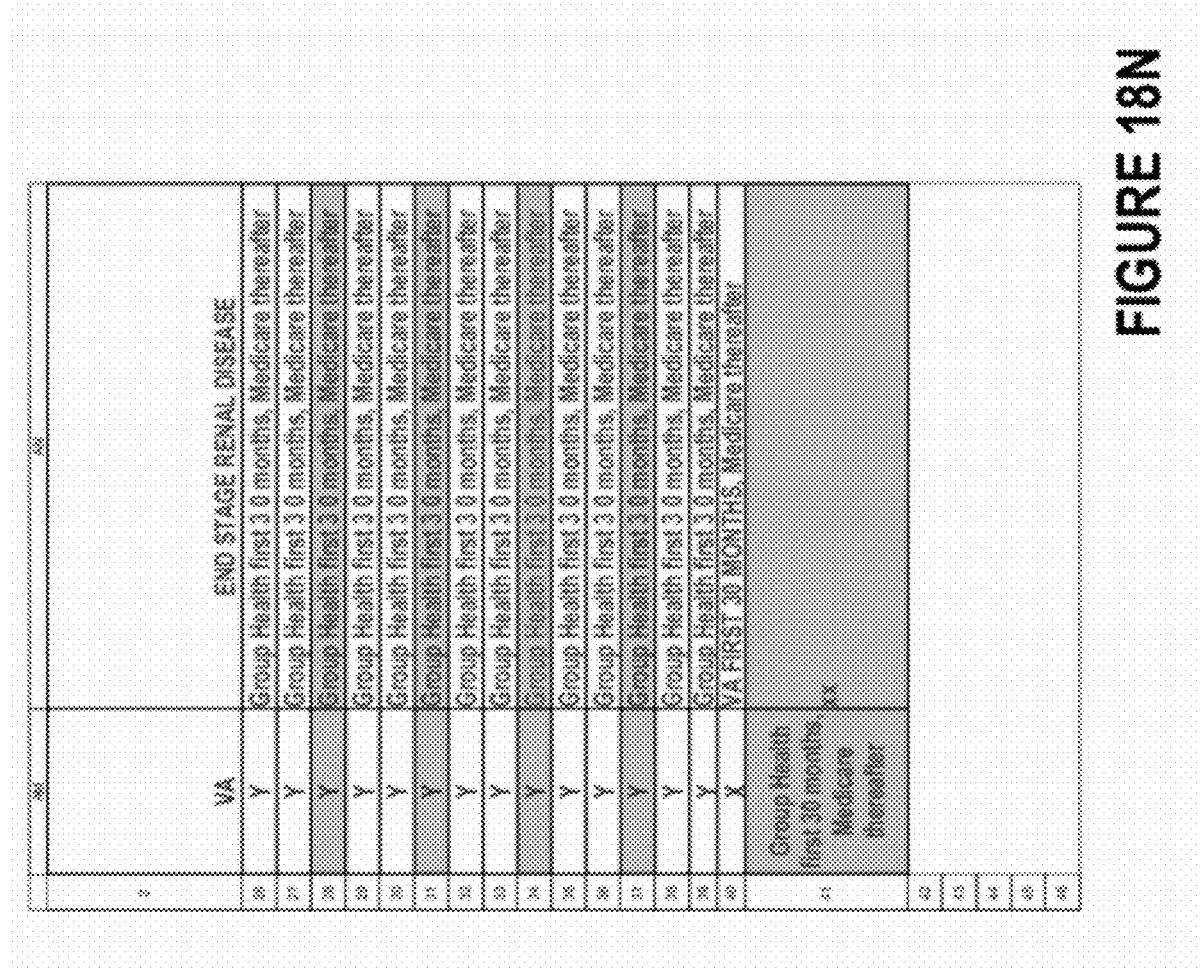

FIG. 18A-N shows the matrix whereby claim resolution of primacy between two different payers is determined in relation to the medical plan categorization of the coverage status of the insured in accordance with the invention. FIG. 18A-N collectively form FIG. 18 as shown

FIG. 20 shows an embodiment of an electronic form provided by the system and used for login to the registration process by health plan subscribers in accordance with the invention.

FIG. 21 shows an electronic form provided by the system in an embodiment to gather company and contact information from health plan subscribers during their registration with the system in accordance with the invention.

FIG. 22 shows an electronic form provided by the system in an embodiment which allows registering health plans to indicate their level of participation in the system in accordance with the invention.

FIG. 23 shows an embodiment of an electronic form provided by the system which gathers information and contact points that will be used by the system to query a registrant health plan in accordance with the invention.

FIG. 24 shows an embodiment of an electronic form provided by the system which is used to verify a registrant's choice of the highest level of participation in the system prior to uploading eligibility data of their insureds in accordance with the invention.

FIG. 25 shows an embodiment of an electronic form provided by the system which is used to set up the cryptographic data used to authenticate a registered health plan when the Plan wishes to communicate with the system via the private network and to provide contact points for testing such communication in accordance with the invention.

Figure 28:
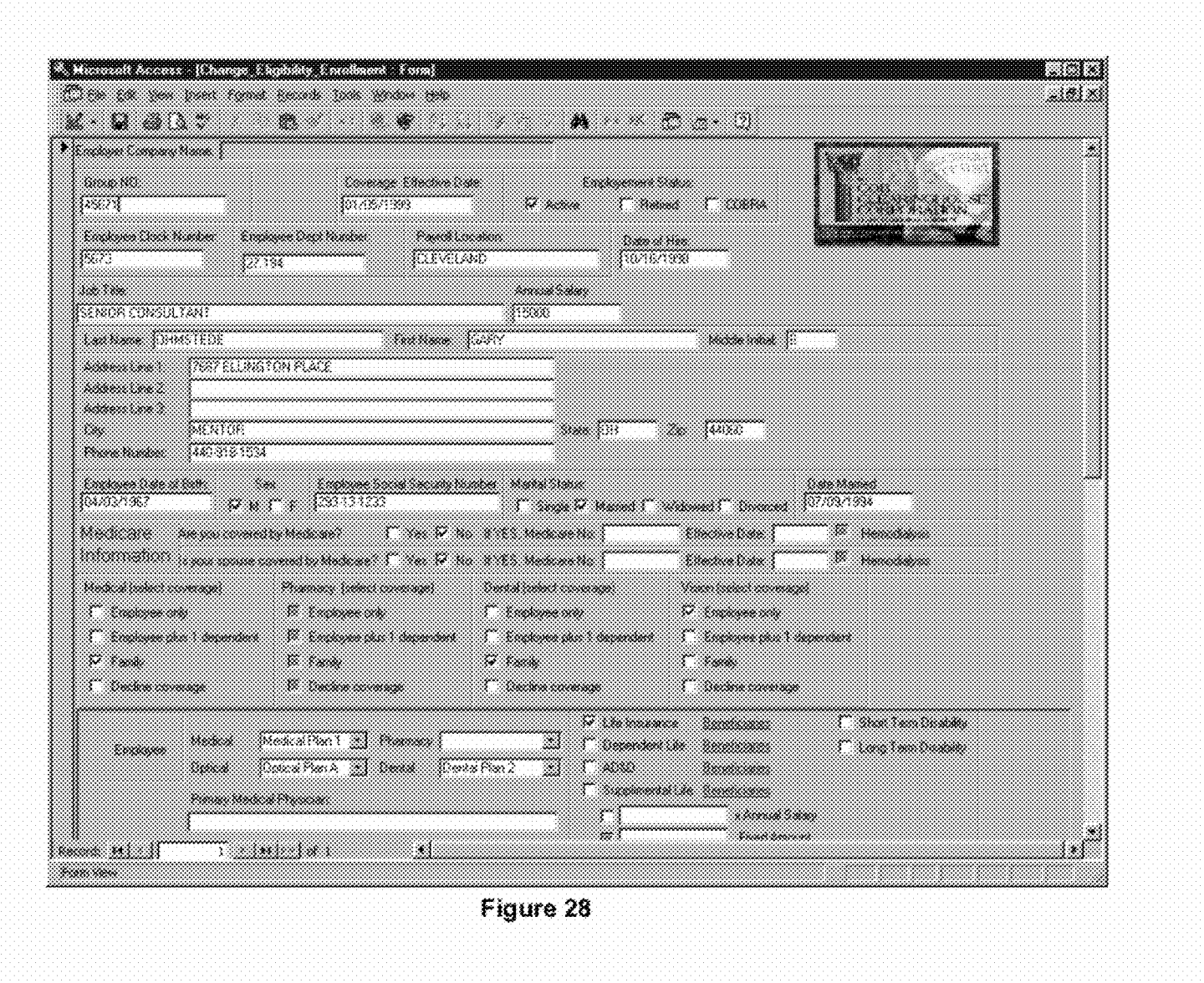

FIGS. 26-29 show embodiments of electronic forms provided by the System and used by a health plan that is a fully participating subscriber to the System to initiate a change in the coverage of an insured individual in accordance with the invention, or of coverage provided to a group of beneficiaries. FIG. 26 shows a form used for entry of information used to access change forms for the insured individual. FIG. 27 shows a following form, which is used to indicate the general nature of the change. FIG. 28 shows the upper portion of a form that displays the insured's coverage information. FIG. 29 shows the bottom of the form that the insured's coverage information, which the Health plan uses to make a change in dental coverage for the spouse of the insured.

DETAILED DESCRIPTION

Figure 1:
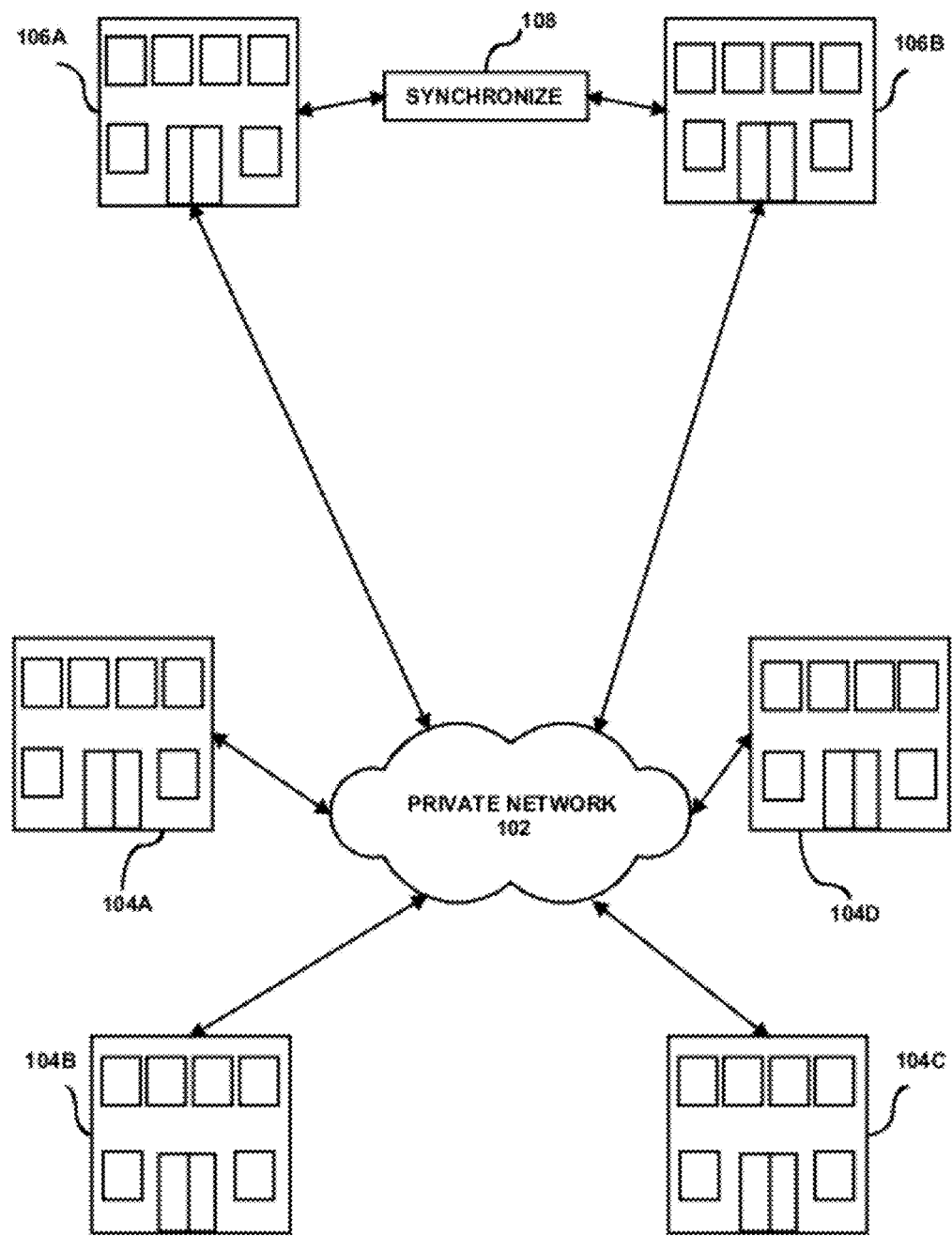
FIG. 1 is a block diagram showing two large-scale synchronized computers accessible by users of a private computer network in accordance with the invention.

In accordance with the present invention, an automated insurance claim resolution system acts as a clearinghouse or value added network using the definitions in the Health Insurance Portability and Accountability Act of 1996 (HIPAA: 42 USC 1320). This has clear economic and legal advantages for users of the automated insurance claim resolution system and for the nation. The financial advantage offered by the great reduction in the cost and the time needed for processing claims, by the increase in income for medical Providers and the decrease in claims processed by health plans strongly encourages participation, which results in greater regulatory compliance within the health care industry, and, consequently, greater protection of fiduciary trust accounts chief among which are government-sponsored health plans.

The automated claim resolution system (hereinafter also referred to as the System) serves both medical providers (including doctors, hospitals, pharmacies) and health insurance payers or "insurers" (including indemnity insurers, HMOs, PPOs, Dental and Optical plans, etc), and the Plan Sponsors who buy or operate those health plans (including corporate plan sponsors, state employee and state retirement systems, cities, counties, school districts, and five Federal health plan sponsors, etc.).

As used herein, a insurer or, alternatively, a payer is an entity offering insurance; a policy is a collection of benefits and contract terms that collectively define a type of insurance coverage offered; and a health plan is one or more policies as administered by a payer. Thus, when a health plan is said to take some action, it should be understood to mean that a payer is taking the action in the administration of the subject policies. Of course, when describing what a health plan covers or requires, it should be understood that the benefits and/or contractual terms of the health plan's subject policies cover or require such. A sponsor is an entity that acquires and administers health care insurance coverage on behalf of a number of insureds. The classic example of a sponsor is an employer.

The System improves health insurance claims processing by quickly and accurately (i) verifying the identity of the patient, (ii) establishing which health plan is the primary payer for a specific patient's medical treatment, (iii) diverting claims that are primary elsewhere, (iv) helping enforce contractual and legal obligations regarding payments, and (v) limiting bills according to the coverage for each patient and for each medical service provided to the patient.

Health plan subscribers of the System create and share standardized information which is stored at two or more remote, continuously replicated computers accessible by users of the system via a private computer network.

In the preferred embodiment, there are three possible levels of health plan participation. Of the three possible levels of participation, all users at minimum answer the Ssystem's automated eligibility queries (referred to in the industry as ANSI 270 messages, because of the name of the standard form used) and claims (ANSI 837 messages), as needed.

One participation level involves doing nothing more than that. Health plans participating at this first level are sometimes referred to herein as "participating health plans."

A second level of participation includes storing accurate, complete, and current enrollment data within the System. Health plans participating at this second level are sometimes referred to as "cached health plans" since their enrollment data can be seen as a huge cache of enrollment data that would otherwise require many eligibility query and claim messages.

The accuracy, completeness, and currency of the enrollment data is maintained by periodic updates provided in large-scale uploads from the health plan. In one embodiment, a cached health plan can upload only incremental changes to the enrollment data to be incorporated into the cached enrollment data by the System upon receipt. Preferably, the entire body of enrollment data is periodically refreshed from the cached health plan such that risk of data gaps in incremental updating is substantially eliminated.

Cached health plans are unhosted and are therefore free from the burden of responding to millions of eligibility query and claim messages and would enjoy a means for recovery of lost or corrupted enrollment data as the System would serve as a backup. Enrollment data stored by cached health plans continues to be primary in that the duplicate enrollment data is meant for read access only to serve as information used in primacy determinations. The enrollment data stored by the cached health plan continues to be primary in that any changes to the enrollment data are made directly in enrollment data maintained by the health plan. Cached health plans continue to utilize their own facilities for data entry. Cached health plans also receive, process, and report remittances to the System.

A third level of participation involves primary hosting of the enrollment data of the health plan within the System. Health plans participating at this third level are sometimes referred to as "hosted health plans." The enrollment data of the health plan stored within the system is primary in that changes to the enrollment data is effected by direct manipulation of the enrollment data through user interfaces and tools provided by the system. In effect, the System provides a complete, remote replacement to enrollment data management systems currently used by health plans.

Hosted health plans, while also agreeing to respond to eligibility inquiries (ANSI 270 messages) and claims (ANSI 837 messages) as a default, maintain their current enrollment data on the System, and the System protects the fiduciary trust accounts of the hosted health plans from primacy errors and the handling costs of claims destined to be rejected for exclusions and limitations as well as the cost of replying to potentially billions of messages each year.

Participation in the automated insurance claim resolution system also enables the 4,500 health plan payers and millions of sponsors to comply with government regulations at lower cost. The System includes logic accurately mirroring applicable rules relating to state and federal regulations regarding the practices of the health care industry. In addition, the operator of the System maintains currency of the mirrored rules in the logic. By applying this logic to transactions occurring in claim primacy determination, the System can detect non-compliance with the applicable rules and, in this illustrative embodiment, reports such non-compliance to authorities charged with enforcement of the rules.

In the preferred embodiment, a private network 102 seen in FIG. 1 connects a number of offices 104A-D and a number of redundant servers 106A-B located remotely from one another. Offices 104A-D can each be corporate headquarters, an information technology (IT) office, and/or call centers to handle telephone calls related to the insurance resolution services provided. Private network 102 is a ring network in this preferred embodiment. Other types of private networks and/or virtual private networks can be used, so long as the security and integrity of the private network can be guaranteed.

While four (4) offices 104A-D and two (2) servers 106A-B are shown, it should be appreciated that the number of offices and the number of servers can be fewer or more in number. It is expected that, in practice, many more offices and servers will be used.

Servers 106A-B are fully redundant in that either of servers 106A-B is of sufficient transaction and storage capacity to serve all insurance resolution needs in the North American market without the assistance of the other. Redundancy is provided for system reliability such that insurance resolution can continue despite failure of either of the servers 106 A-B, e.g., due to natural or man-made disasters. Servers 106 A-B periodically, or continuously in some embodiments, synchronize states in a synchronize operation 108. Each of servers 106A-B is, in this embodiment, a large-capacity data center that includes numerous individual server computers, many of which can be virtualized computer systems, operating in parallel and/or cooperatively to process very large amounts of data in the manner described herein.

Figure 2:
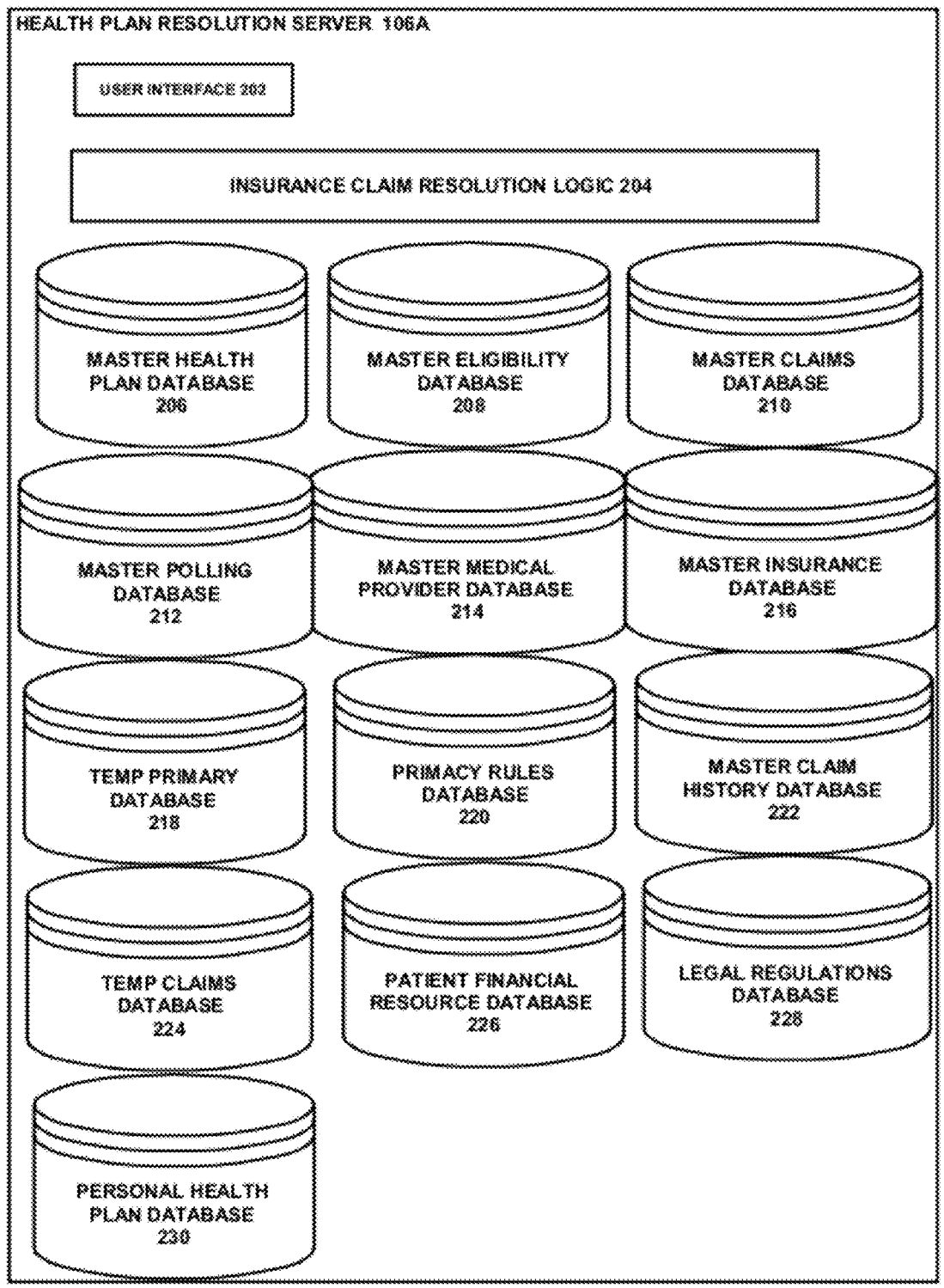
FIG. 2 is a block diagram showing an automated insurance claim resolution server with user interface, insurance claim resolution logic and databases in accordance with the invention.

Servers 106A-B are directly analogous to one another, and the following description of server 106A is equally applicable to server 106B except as otherwise noted herein. The topography of Server 106A is shown in greater detail in FIG. 2.

Server 106A includes a user interface 202 through which payers and medical providers interact with server 106A. In this illustrative preferred embodiment, user interface 202 is a web-based user interface leveraging from a large install base of web browsers or file transfer utilities as thin clients. Server 106A also includes insurance claim resolution logic 204 that is part or all of one or more computer processes executing within server 106A to exhibit the behavior described herein.

Server 106A also includes a number of databases 206-226, each of which is described more completely below.

Registering a Health Plan with the System

In an illustration of the preferred embodiment, a health plan registers as a fully participating user of the System by using user interface 202 to complete electronic forms accessed by the registrant health plan through the World Wide Web and displayed on a computer monitor at the health plan's office. In this illustrative embodiment, server 106A also supports other forms of efficient communication by which health plan can interact with server 106A, including without limitation FTP and EDI messaging.

Figure 3:
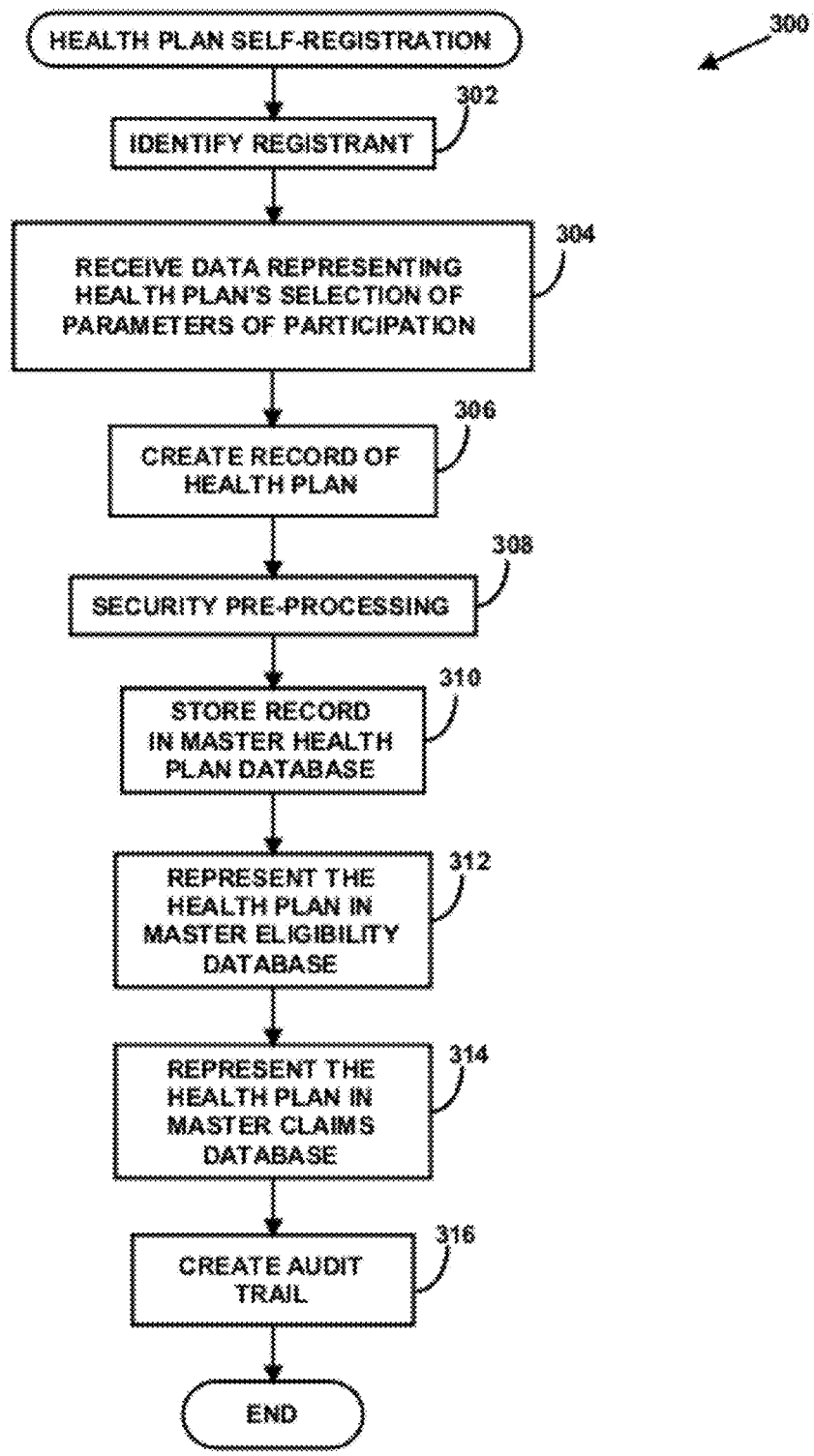
FIG. 3 is a logic flow diagram of the health plan self-registration process in accordance with the invention.

Logic flow diagram 300, seen in FIG. 3, illustrates the process of health plan self-registration, including initial receipt by server 106A of the registrant health plan's enrollment data.

In step 302 of FIG. 3, the registrant health plan provides, and server 106A receives, data identifying the health plan and that data will subsequently used for authentication of the health plan by server 106A. To better protect privacy and maintain security of data, server 106A compares the received identifying data to predetermined identifying characteristics of registered health plans. As health plans are subject to government regulation, all health plans that might choose to register with server 106A are known and server 106A uses that information to enhance authentication and privacy. A similar process is used when authentication physicians and medical service providers.

The identifying data includes password and other authentication data for subsequent, highly-secure authentication of the health plan and for a number of agents authorized by the health plan. FIG. 20 shows a screen view of a form used by server 106A to authenticate an agent of a health plan prior to granting access to the health plan's data. The agent enters a username 2002 and a password 2004, previously assigned by the System or generated and provided by the health plan and pressed login button 2006 to send the authentication data (the username and the password).

ICRL 204 (FIG. 2) then identifies the registrant health plan, and server 106A brings up a display of the electronic form seen in FIG. 21. The registrant enters the health plan company name at 2102, Home Office zip code at 2004, can elect to choose a different user name at 2106 or a different password at 2108, adds company contact information in 2110, 2112, 2114, then at 2116 uses a button to move to the next form.

In step 304, the registrant health plan indicates an intended level of full participation as a user to the System by using button 2206 (rather than button 2202 or 2204) in the electronic form shown in FIG. 22. As noted heretofore, a subscribing health plan that chooses full participation uploads to the System the enrollment data of those people it insures and keeps the enrollment data updated by using electronic forms available for that purpose on the System's private network 102, which is accessed via the Web.

After indicating the desired level of participation, the registrant uses button 2208 to move on to the form seen in FIG. 23, in which information is provided that will enable the System to contact the health plan when asking the Plan to respond to an ANSI 270, the industry's standard form used for a patient eligibility request. As noted heretofore, this agreement to respond to ANSI 270s exists regardless of the level of participation selected. To be able to receive ANSI 270 queries from the System when needed, the registrant enters the registrant health plan's own Virtual Private Network (VPN) Access Information using the form seen in FIG. 23. The VPN information includes IP address 2302, username 2304, and password 2306. This is followed by contact points for a person handling ANSI 270s at the health plan company, including Name 2308, Telephone 2310 and e-mail 2312, and by an indication of completion of the form by pressing button 2314.

In step 306, after the registrant has pressed 2314, ICRL 204 creates a record of the registrant health plan's name and contact information and of the cryptographic data which is to be used for authentication of data exchanges with the System. The registration process then moves to step 308 to upload data.

After using button 2314 in the form shown in FIG. 23, the registrant sees a display of the form shown in FIG. 24. By pressing 2402, the registrant downloads an agreement relating to audit and compliance, returns an executed Agreement, then presses 2404 and is shown a display of FIG. 25, which directs the registrant to set up a Secure Socket Layer (SSL) Interface prior to the initial upload of the registrant's data (and subsequent uploads) to the automated claim resolution system. The information required for the Interface is the registrant's choice of a username at 2502, a password at 2504 and contact information at the registrant's company, including a name at 2506, a phone number at 2608 and an e-mail address at 2510. Pressing 2512 brings a display indicating that the registrant can now upload data to the system.

Before accepting the upload, the server, in step 308, executes a "Stack" of business processes to (a) verify, sequentially, based on names, passwords, biometrics, and telephone numbers, the authenticity of the user sending the data; (b) verify the syntactical correctness of the message being sent; (c) verify that the message contains no computer "virus" or other harmful code.

This "Stack", limited to the security, privacy, and authenticity of messaging to server 106A, is here distinct from the other stacks of processes described in herein, and is to be understood as a group of processes run on every transaction with server 106A described herein. Messages that fail these criteria will probably fail the communication standards of other users, and may be fraudulent or otherwise harmful to the fiscal integrity of healthcare finance, and would therefore be rejected at this point.

In step 310, server 106A stores a record of the newly registered health plan's benefit structure(s) in a Master Health Plan Database (MHPD) 206 which retains, among its tables, the terms of coverage under which persons enrolled in the newly registered health plan obtain payment for medical claims. These terms include coverage limitations, deductions, co-pays, co-insurance and exclusions. In addition to providing this data in response to authenticated queries, the MHPD allows server 106A to perform the critical step of facilitating legal enforcement of compliance by various parties to related government enactments such as messaging as per HIPAA Sections 1171-1176, or state-enacted law such as those of Pennsylvania, Oklahoma, New York, and Ohio, or new acts of state legislatures pursuant to the federal Deficit Reduction Act of 2005 (42 USC 1902(a)(25) or new regulations enforcing the SCHIP Extension Act (42 USC 1395 y(b). Use of the MHPD also adds the utility of eliminating the processing cost to the health plan of the 8% of claims that are routinely and correctly rejected on the basis that the plan's coverage structure excludes, and so would deny, payment.

In steps 312 and 314, insurance claim resolution logic 204 represents the new health plan in master eligibility database 208 and master claims database 210, respectively. In step 316, Insurance Claim Resolution Logic 204 creates an audit trail for the newly registered health plan such that compliance with legal regulations and contractual obligations can be monitored, verified and reported, and the process ends.

Legal regulations database 228 includes both state and federal regulations; it is created and kept current by the System operator. This database links the performance or timed-out non-performance of a specific act by a specific party with statutory obligations, typically a health plan, to other default steps, and ultimately to the automated enforcement of the remedies of the law; e.g: a health plan has contracted to upload its enrollment data every day, and has failed to do so, the system defaults to ANSI 270 eligibility inquiry messages. health plan has failed to reply to ANSI 270 messages, download enforcement notice to state attorneys general, issue subpoena form to attorney general's fraud unit where state law requires that step in enforcement.

Figure 4:
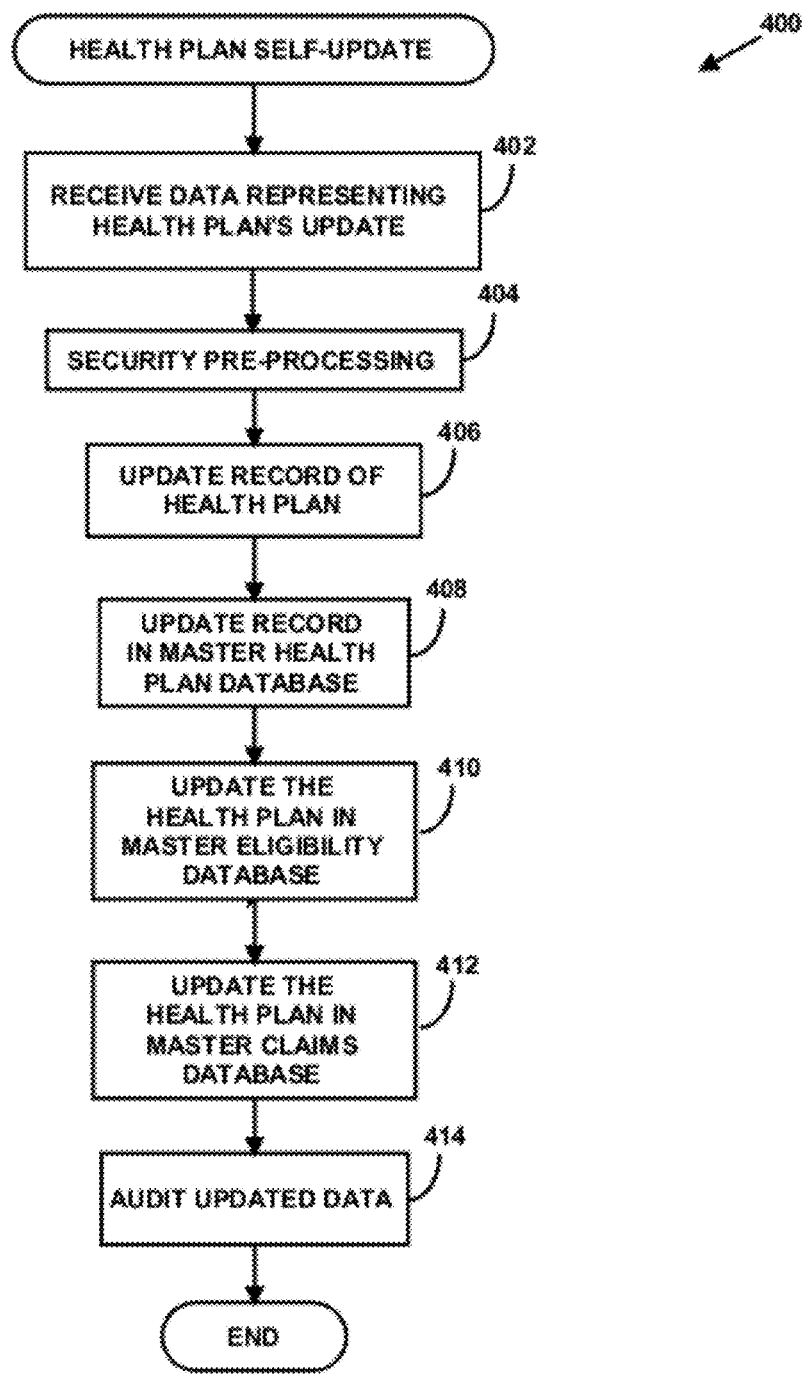
FIG. 4 is a logic flow diagram of the health plan self-update process in accordance with the invention.

Logic flow diagram 400, seen in FIG. 4, shows the updating of health plan information in the preferred embodiment.

In step 402, ICRL (Insurance Claim Resolution Logic) 204 receives data representing updated information of the health plan. In an illustration of the preferred embodiment the entry of updates to the health plan's data is done by the use of electronic forms FIGS. 26-29, showing four successive displays accessed via the System's private network on the Web and displayed on a computer screen at the user's office. Using the display of the electronic form seen in FIG. 26, the user enters the Social Security number at 2602 of an insured individual, then uses the 'Find' button, 2604. This brings a display of FIG. 27, which shows, in this example, the name and other identifying information about the insured. By checking the box seen in 2702 the user indicates that a change is to made in coverage. Then with button 2704, the user is taken to the electronic form shown in FIG. 28. The top portion (shown as FIG. 28) of the form shows various information about the subject insured individual. Scrolling down to see the lower portion of the same form (shown as FIG. 29), the user indicates at 2902 that the change in coverage concerns the spouse of the insured and is a change in the dental plan indicates at 2510. After those changes are complete, the update process moves to step 404.

In step 404, ICRL 204 performs security preprocessing in the manner described above with respect to step 308.

In step 406, ICRL 204 updates a record of the health plan in Master Polling Database 212. Master Polling Database 212 represents the various elections of various health plans and maintains information regarding the manner in which the System will poll each health plan when submitting eligibility inquiries and requests for insurance claim resolution. Master Polling Database also includes the custodians of payroll tax records for those health plans (such as Massachusetts') which require a showing of income levels to justify coverage.

In step 408, ICRL 204 updates the records of the Master Health Plan Database 206 using the data received in step 402.

In steps 410 and 412, insurance claim resolution logic 204 represents the updated health plan information in Master Eligibility Database 208 and Master Claims Database 210, respectively. In step 414, ICRL 204 updates the Audit data for the health plan such that its compliance can be subsequently monitored and verified.

Registering a Medical Provider with the System

Figure 5:
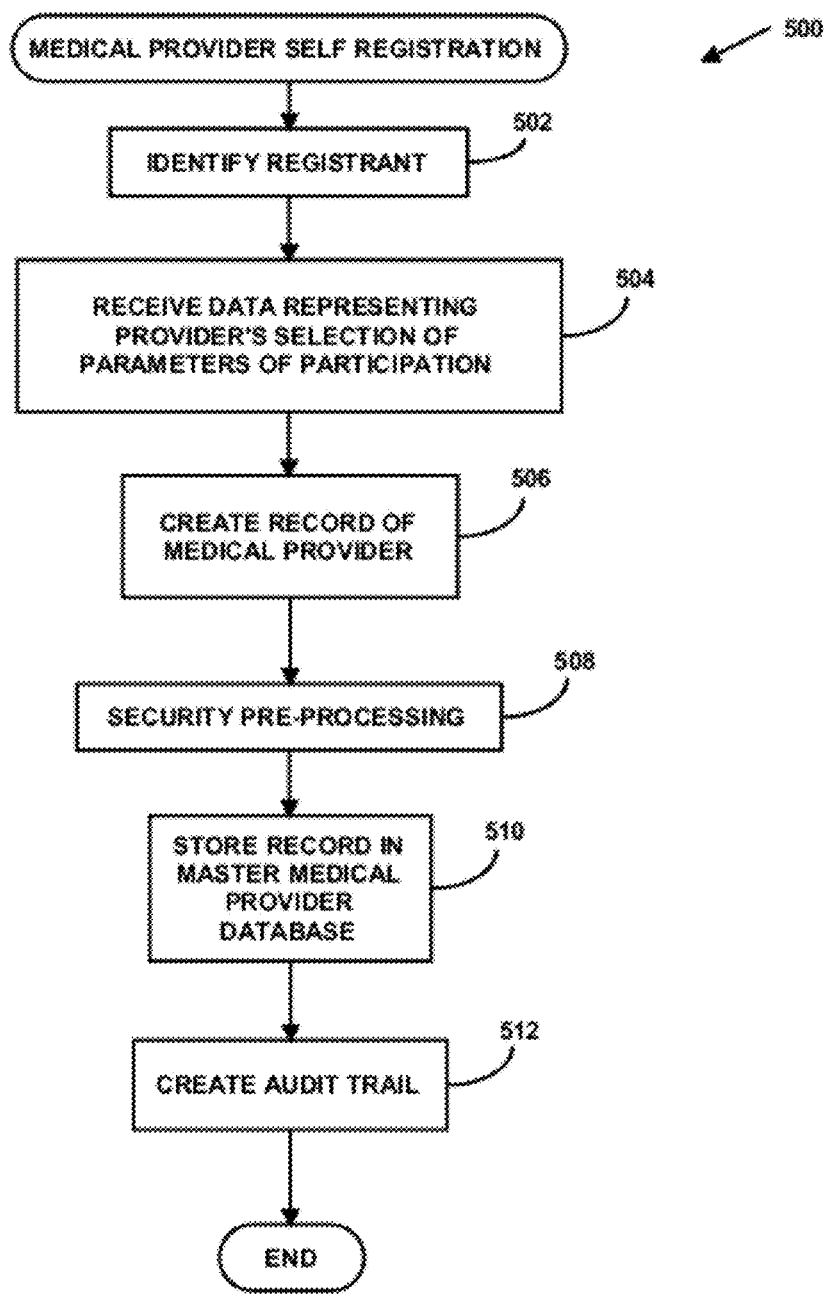
FIG. 5 is a logic flow diagram of the medical provider self-registration process in accordance with the invention.

Logic flow diagram 500, seen in FIG. 5, illustrates self-registration for medical providers, similar to that shown in FIG. 4 for health plans. As health plans elect to establish the automated claim resolution system as the "Inbox" for their claims in order to obtain the benefits of automated business processes, medical providers elect to transmit their claims through server 106A as a means of getting their bills paid. The medical provider elects to participate either by filing claims free of charge to identified health plans and risk rejection of those claims by any of the processes described herein that follow the filing, or pays the operator of the automated insurance claim resolution system for the services of automatically determining primacy, billing and balance billing, the enforcement of prompt pay and managed care contract amounts and other processes laid out below. In this illustration of the preferred embodiment, the medical provider elects to pay for the services of the System.

In step 502 ICRL 204 identifies the registrant medical provider's using cryptographic data given earlier by the operator of the System. In step 504, ICRL 204 receives the registrant's election as a full participant in the System and issues passwords and other security measures. The registration process then moves to step 506 for security pre-processing in the manner described above with respect to step 308. After passing security pre-processing in step 506, ICRL 204 creates a record of the registrant medical provider in step 508, including the election of participation level and the cryptographic data used for subsequent authentication for data exchanges involving the new medical provider. In step 510, ICRL 204 stores the record of the newly registered medical provider in Master Medical Provider Database 214. Then in step 512, ICRL 204 creates an audit trail.

Figure 6:
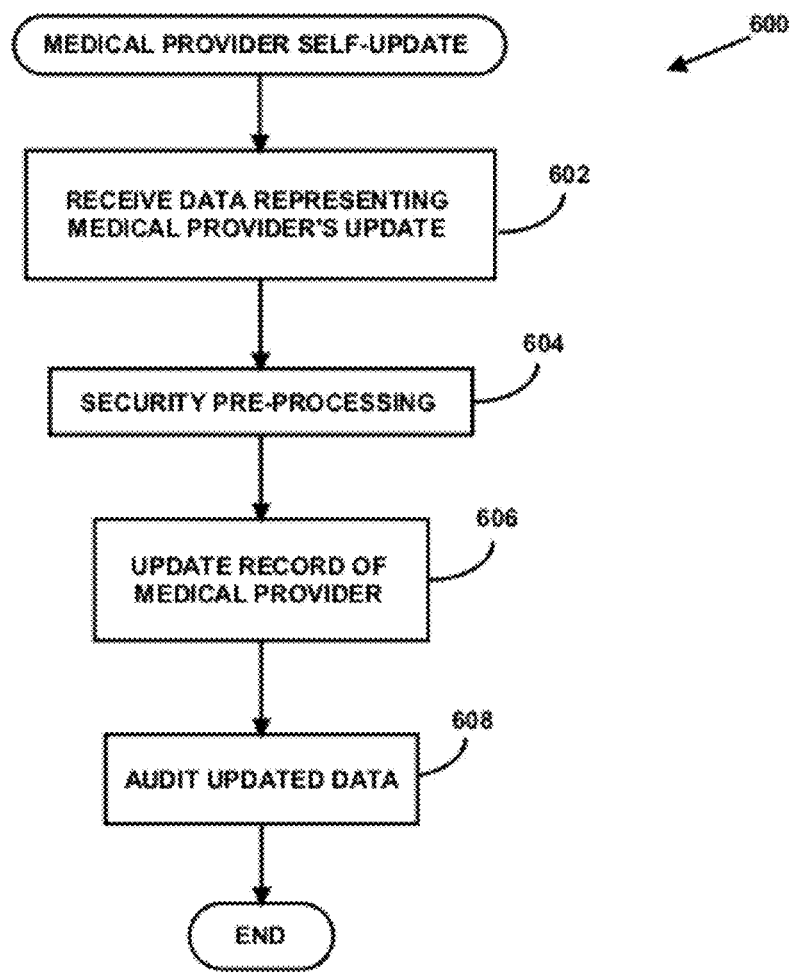
FIG. 6 is a logic flow diagram of the medical provider self-update process in accordance with the invention.

Logic flow diagram 600, seen in FIG. 6, represents the updating of medical provider information, including services to patients, bills submitted, and the medical provider's contact information. In step 602, ICRL 204 receives data representing updated information of the medical provider. In step 604, ICRL 204 performs security pre-processing in the manner described above with respect to step 306. In step 606, ICRL 204 updates the record of the medical provider in Master Medical Provider Database 214. And in step 608, ICRL updates the medical provider audit data such that compliance can be subsequently monitored and verified.

Biometric Identification of the Patient, and Subscriber Employees

Figure 7:
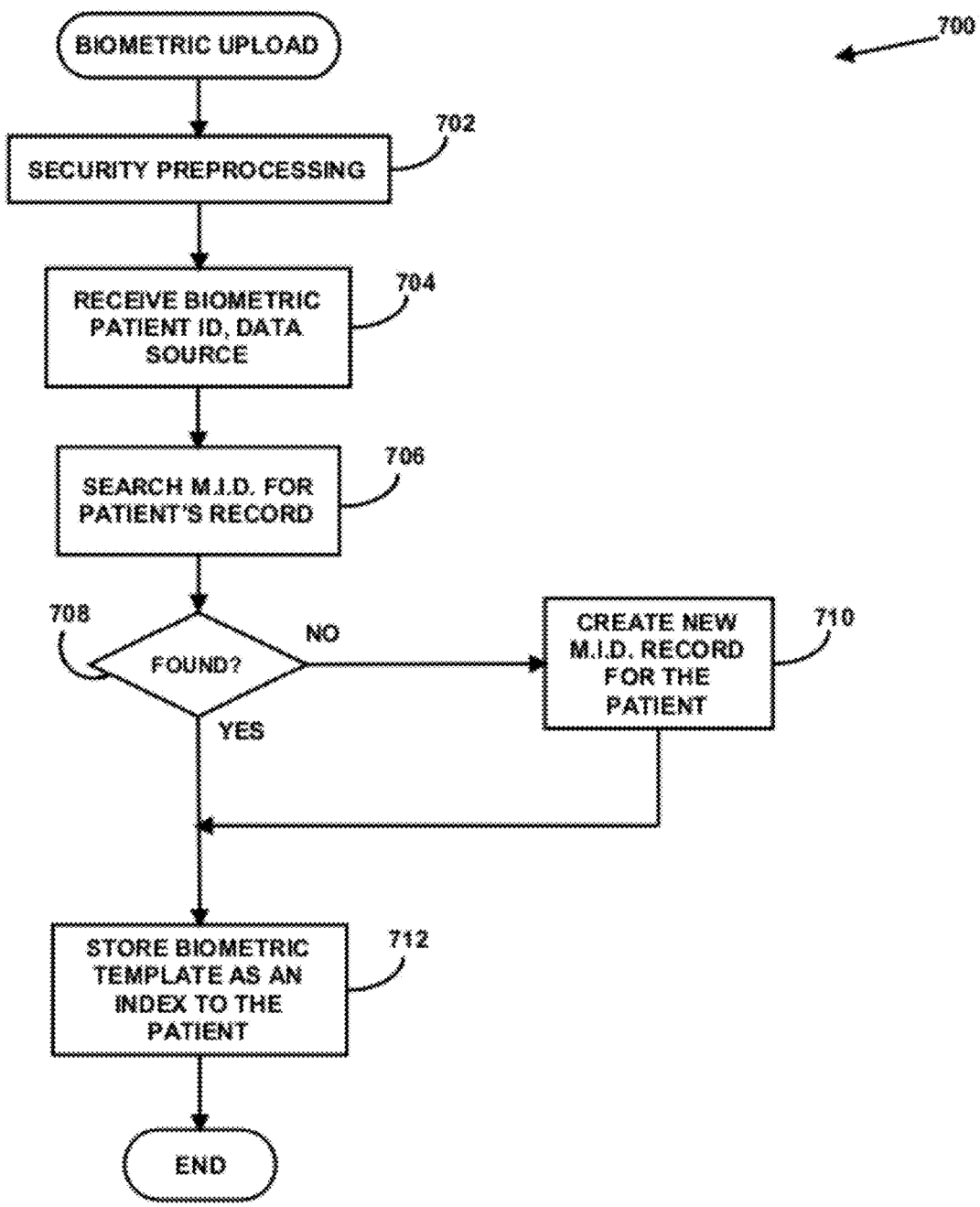
FIG. 7 is a logic flow diagram of the creation and storage of a biometric template as a patient identification index in accordance with the invention.

Logic flow diagram 700, seen in FIG. 7, illustrates the process of adding a means of biometric recognition to the security steps in the security preprocessing stack, and to the patient and User identification process required for authentication prior to communicating with the automated claims resolution system. Biometric identification reduces the risk of false identification of insurance and therefore reduces both the number of false claims and the greater human effort and cost needed in correcting erroneous findings. While applicable to health plans, more regular use is expected by Medical Providers. The biometric process includes the steps of a medical provider uploading a biometric template from a biometric reader, and being asked by private network interface with server 106A to furnish other identifiers such as name, date-of-birth, gender, zip code from a credible photo ID such as a driver's license. The system then either loads the new biometric data as an index next to a pre-existing entry in the Master Insurance Database (MID) or Authorized User Database, or if those same identifiers are not found in said database, the system creates a new identity, recording all transmitted data.

In step 702, ICRL 204 performs the security preprocessing described above with respect to step 308. In step 704, ICRL 204 receives the biometric data and data identifying the patient to which the biometric data belongs, as well as authentication data. In step 706, ICRL 204 retrieves data of the identified person from the (MID) master insurance or Authorized User database 216 or. Master insurance database 216 and store data representing all persons offering a digital thumb print as an identifier for transactions with server 106A.

In test step 708, ICRL 204 determines whether a record representing the identified patient is found within master insurance database 216 or. If not, ICRL 204 creates a new record for the identified person in step 710. If the record is determined in test step 708 to be found, ICRL 204 skips step 710.

In step 712, ICRL 204 stores the biometric data as an index to the person's records within Master Insurance Database 216 or Authorized Users from Databases 214 and 216 for subsequent authentication of the patient using the biometric data.

Processing a Submitted Claim

Figure 8:
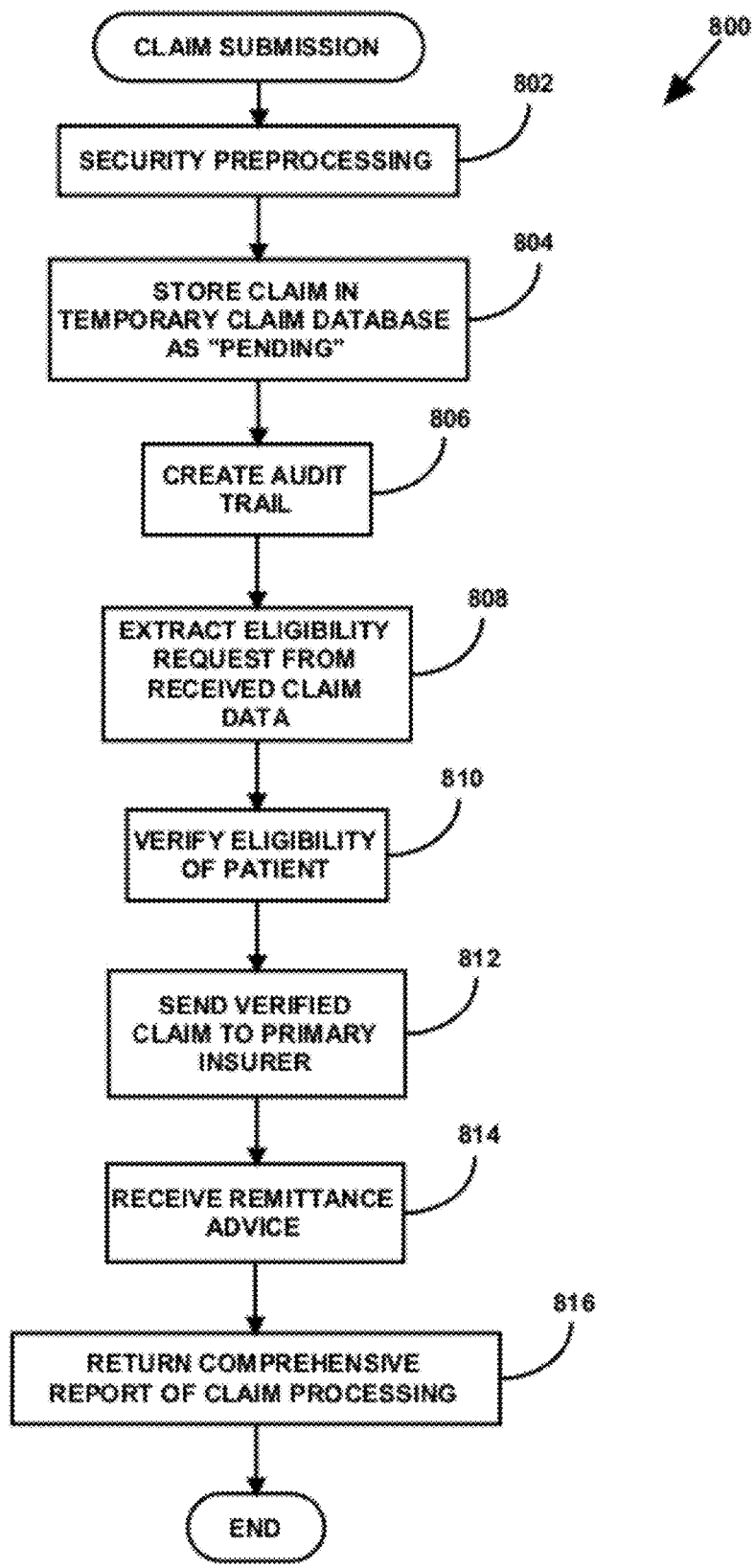
FIG. 8 is a logic flow diagram of claim submission in accordance with the invention.
Figure 9:
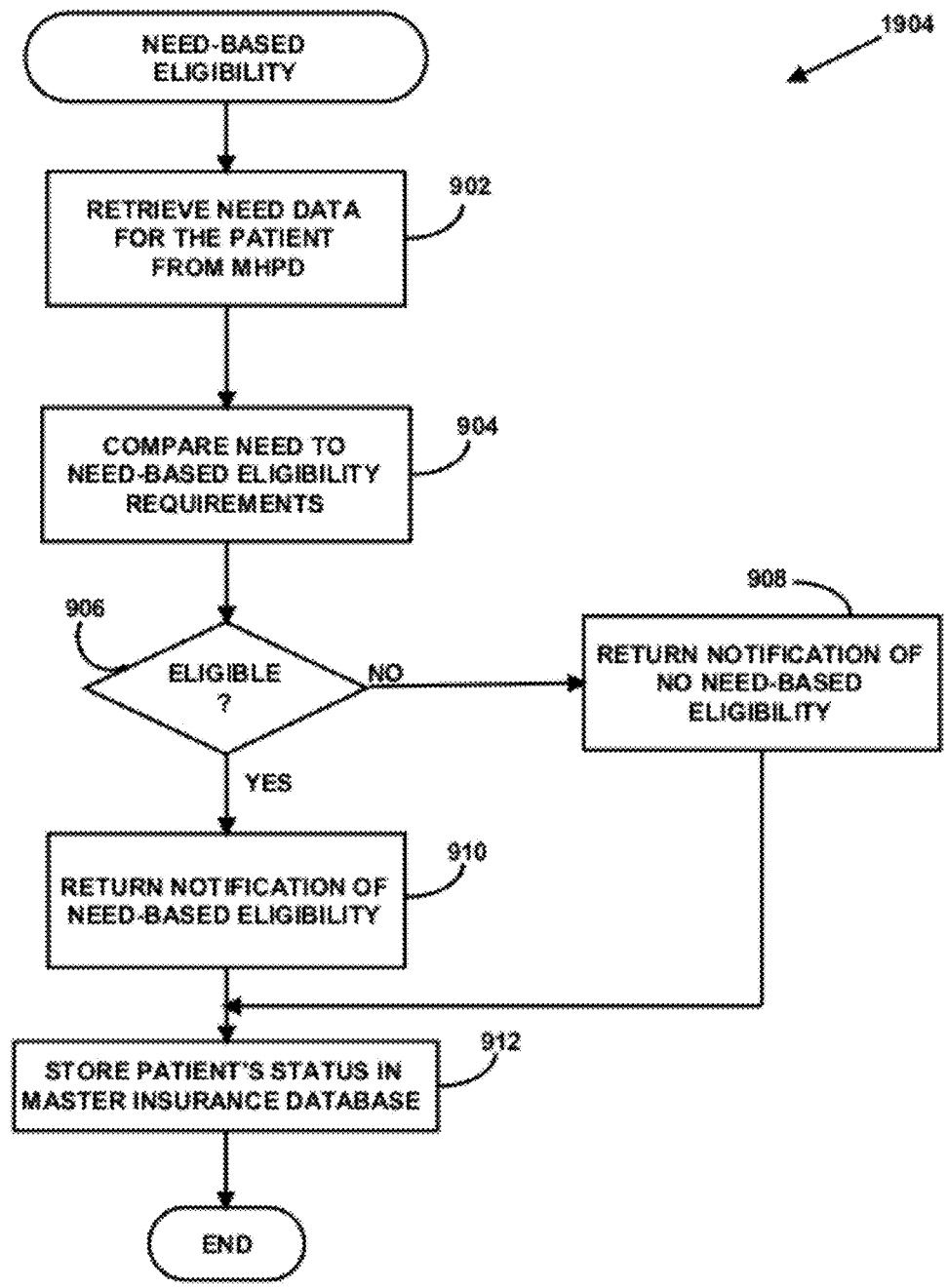
FIG. 9 is a logic flow diagram showing the process of determining the status of a patient's financial resource-based eligibility in accordance with the invention.

Logic flow diagram 800, (FIG. 8), illustrates the processing of a submitted claim for insurance coverage of medical services. In step 802, ICRL 204 performs the security preprocessing described above with respect to step 306 to authenticate the medical provider and identify the patient. In step 804, medical and financial data, representing the claim (ANSI 837 standard data set), are "parked" in a Temporary Claim Database (TCD) 224 while primacy is established in the manner described below.

Figure 19:
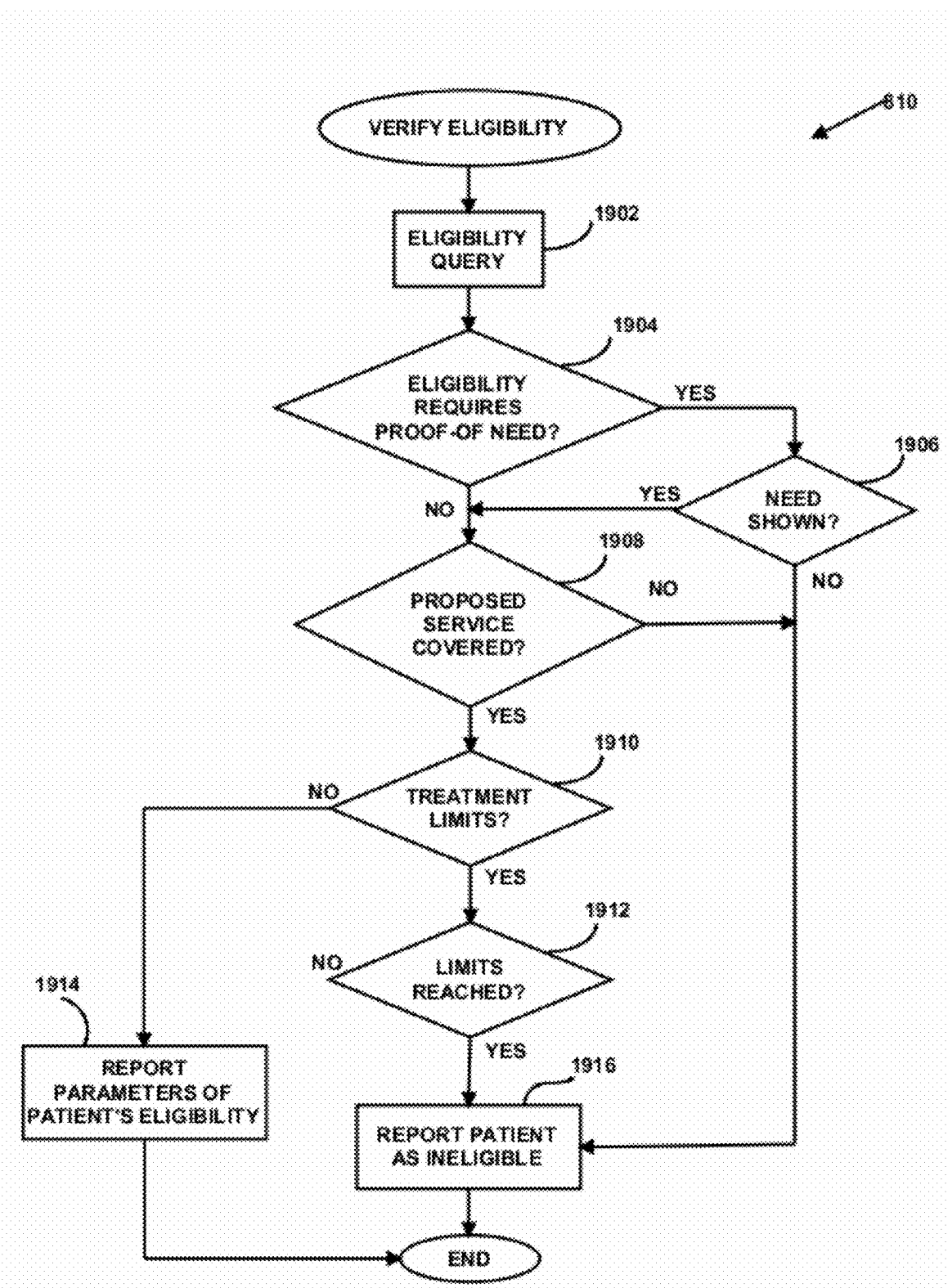
FIG. 19 is a logic flow diagram showing the automated process of determining patient eligibility during step 810 of the claim submission process in accordance with the invention.
Figure 26:
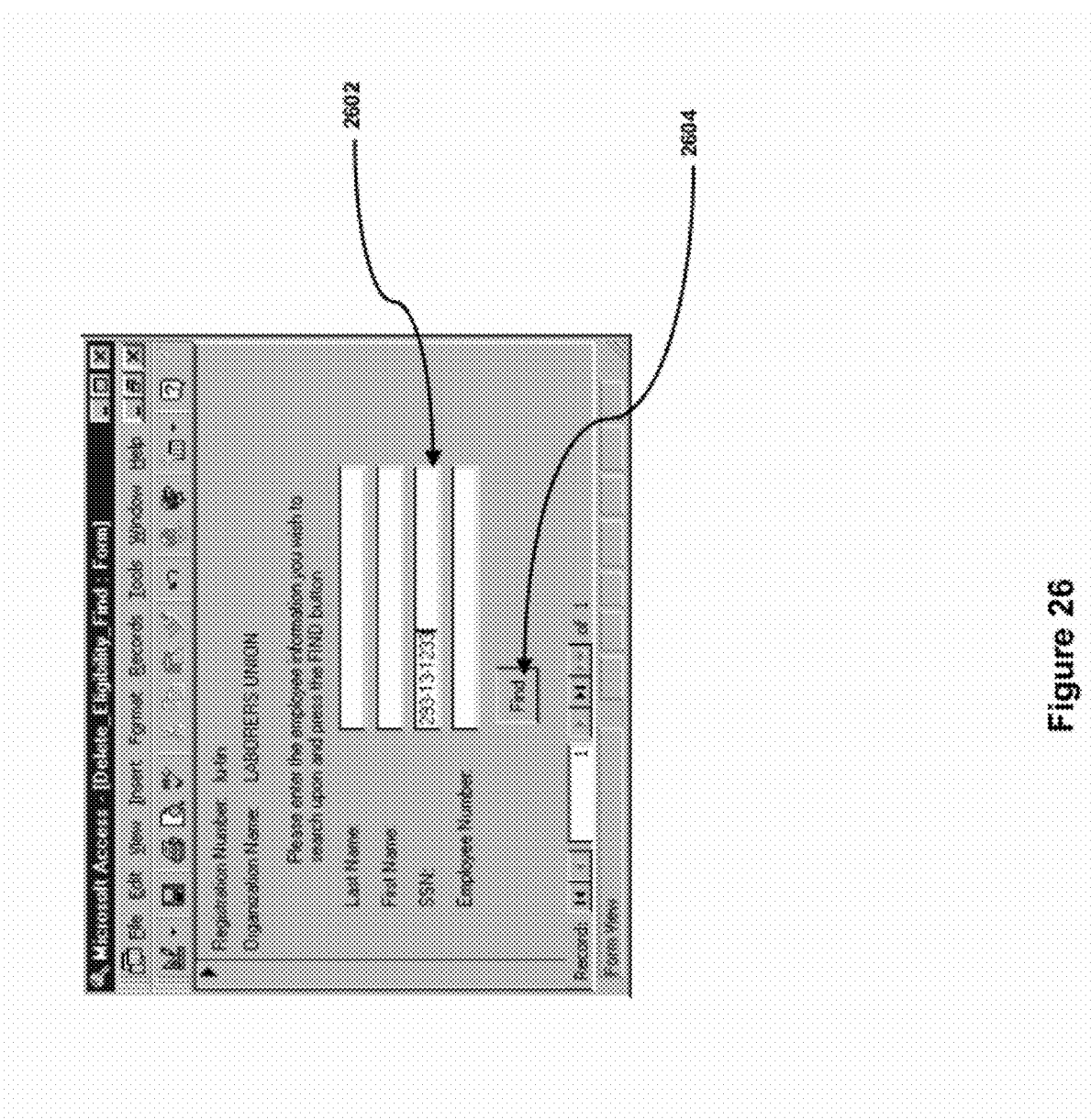
Figure 27:
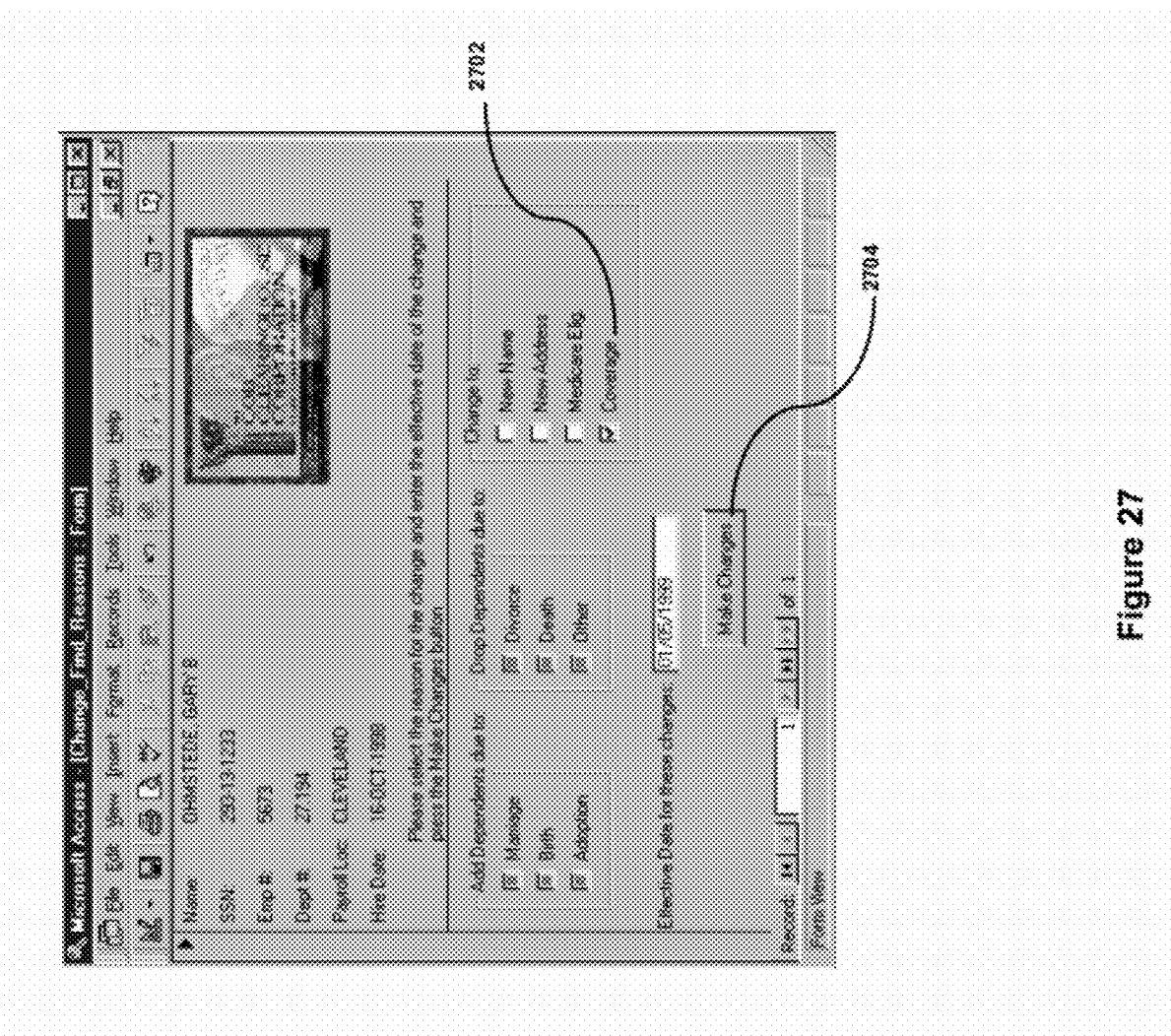
Figure 29:
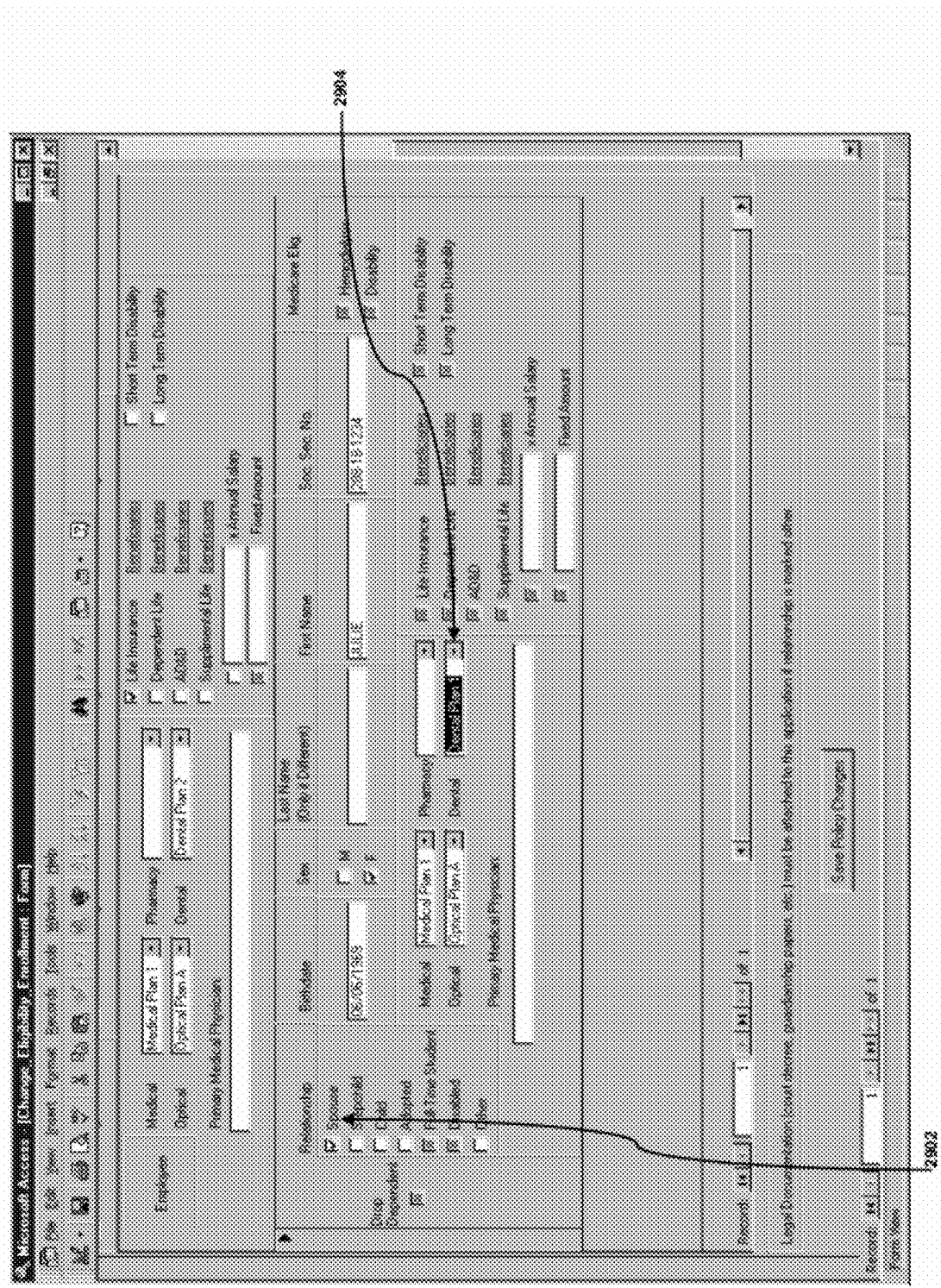

In step 806, ICRL 204 creates an audit trail for ensuring compliance with legal requirements. In step 808, ICRL 204 extracts data representing an eligibility request from the received claim data. In step 810, ICRL 204 verifies eligibility of the patient in a manner described in FIGS. 10 and 19, discussed below.

After ICRL 204 verifies eligibility in step 810, the claim data is forwarded from TCD 224 in standard ANSI format to the primary payer in step 812. When remittance advice is received from the primary payer in step 814, the data is stored in tables supporting the Master Claims History, Database 222, and the Personal Health Plan Data, Database 230, of the patient, and the remittance data reported to the user initiating the claim.

Figure 11:
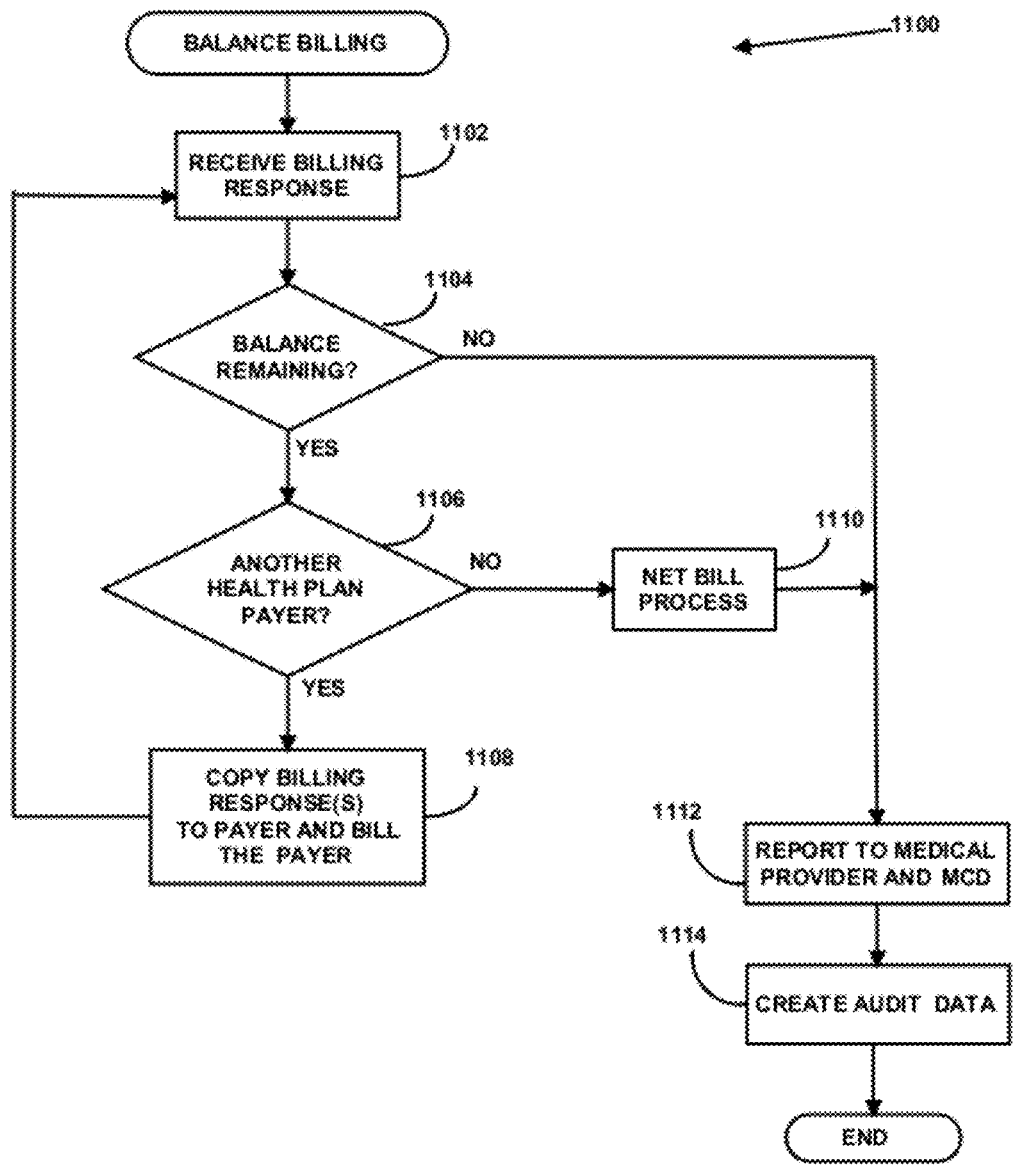
FIG. 11 is a logic flow diagram showing, in accordance with the invention, the balance billing process, where responsibility for payment of a claim can rest with more than one payer.
Figure 12:
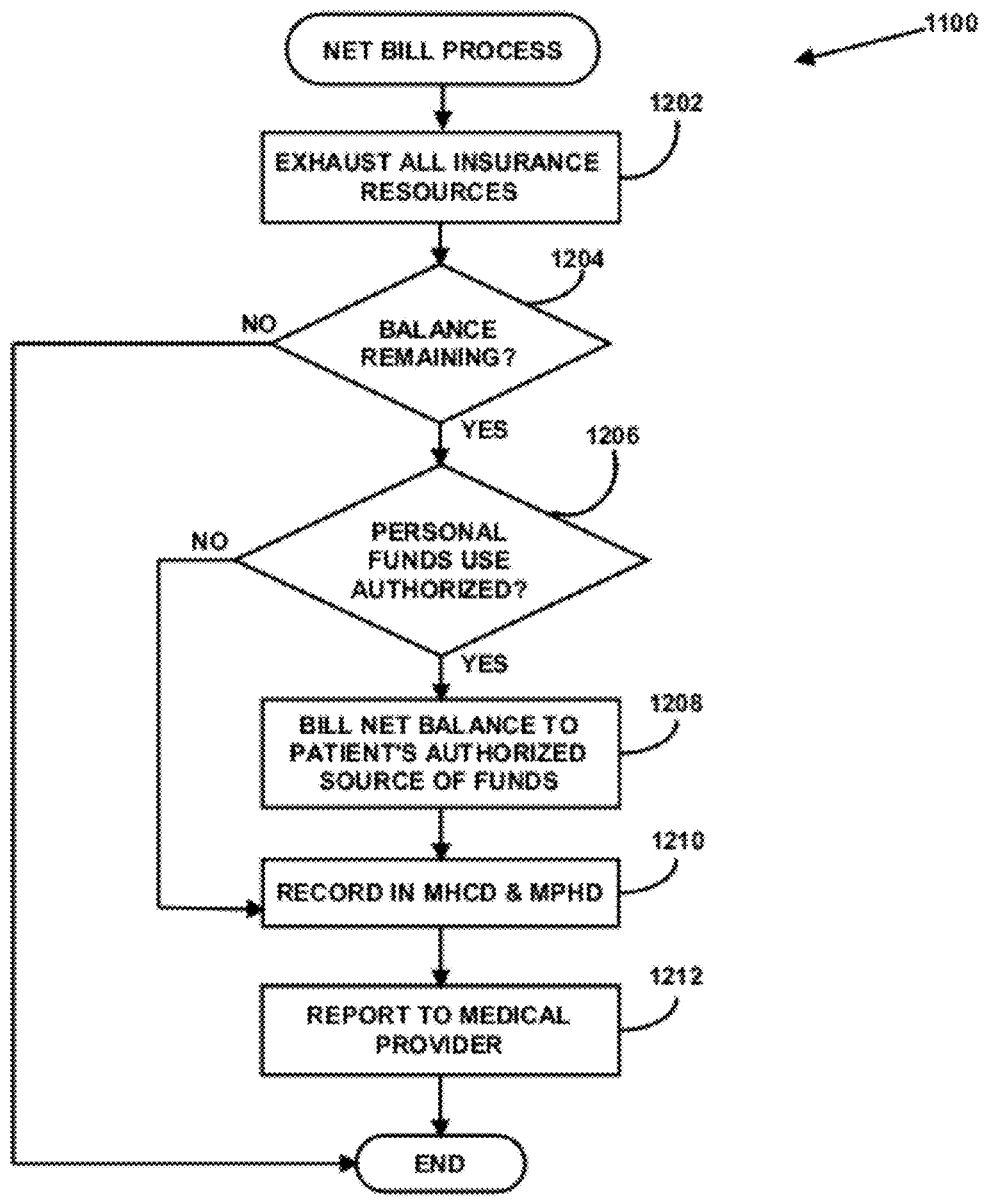
FIG. 12 is a logic flow diagram showing the process of billing to the patient any net balance due to the provider, in accordance with the invention.
Figure 13:
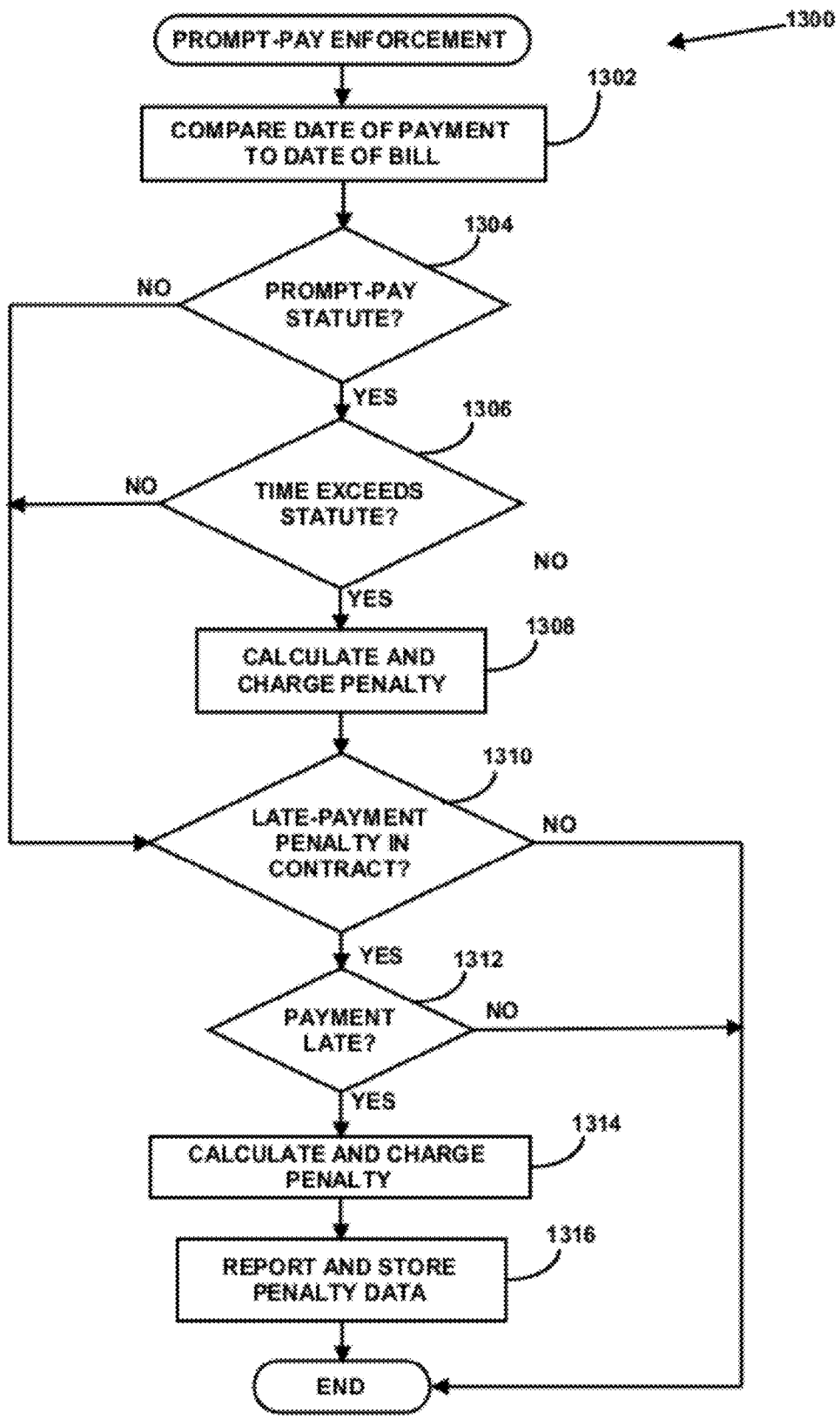
FIG. 13 is a logic flow diagram showing the process of monitoring, reporting and imposing penalties regarding prompt payment of providers according to contractual and statutory requirements in accordance with the invention.

Addressing a claim to its payers is set by the Subscribing health plan in the Self-Registration process of logic flow diagram 300 of FIG. 3. In most cases, claims will forward from server 106A to the primary health plan. Others will instruct the system to forward the claim to a Preferred Provider Organization (PPO) or other re-pricer. Still others may segregate various claims and forward either primarily or send a copy to a utilization review or other entity for other business processes prior to payment. Logic flow diagram 800 assumes only one health plan is found for the patient. Logic flow diagram 1100 (FIG. 11)—described below—shows the process when a plurality of health plans are found.

Determining Primacy Among a Plurality of Possible Payers

ICRL 204 includes a Rules Engine, i.e., logic that evaluates rules determined according to current application rules and law and represented in primacy rules database 220. Primacy determination by the Rules Engine can be represented as a table, as seen in FIGS. 18A-N. The Rules Engine executes the first level of primacy determination in step 1708 of the logic diagram of FIG. 17, described below in detail. This first level of primacy determination operates by comparing the 'coverage status' of a given person covered by two Health Insurance Plans. For instance, under the (NAIC) National Association of Insurance Commissioners COB (Coordination of Benefit) rules, which were Federalized in 1997 in a decision called McGurl vs. Trucking Employees (124 F.3d 471 (3rdCir. 1997)) These rules seen in the table of FIGS. 18A-N are the only rules admissible between two 'commercial' (rather than government) health insurance plans.

The table shown in FIGS. 18A-N also includes rules arising under Federal regulation for Medicare, Medicaid, TriCare (Military), the Veterans Administration, and others.

The patient's coverage status on one insurance plan is one of the entries on the horizontal, or 'X' axis of the table seen in FIGS. 18A-N, and her coverage status on a second plan is one of the entries on the 'Y' or vertical axis of the table. In this illustration the patient is covered by her employer (X-axis) and on a second plan (Y-axis) as the wife of an employee covered by a different plan. On the X-axis, as indicated by 1804, she is a commercial active employee. On the Y-axis, she is a spouse, as indicated in 1806. These two groupings intersect, 1808, in a box marked with an X within table 1802, indicating that the X axis coverage as a commercial active employee is the primary coverage.

This determination of primacy is then entered in Master Insurance Database 216, and retested and revised in a date-sensitive repetition every time the patient's coverage changes, if the data changing the entry comes from a health plan's enrollment update, or on the commencement of a new day's claims, if the data changing the entry comes from a health plan's response to an eligibility inquiry.

The first layer in the process deals with the most cases, but it is possible to be covered as an employee by two plans in which the beneficiary has identical status, for example 'commercial active employee in an insured group of less than 100 people'. In such a case the date of coverage (Rule 5, or R5 in the matrix) determines which plan is primary. In any case where the patient is covered by more than two health plans, the Rules Engine can be used to rank them by comparing the plans, two at a time.

The process is different when we have both data that indicates diagnosis and care, and where the Master Health plan Database 206 also contains plan structure. If, for example, the patient applies for chiropractic care, the process should first review plan structure to determine whether chiropractic is or is not excluded or limited. If it is excluded or its limitations exceeded, then the primary health plan has no financial obligation, and the secondary plan becomes primary. The utility of that process is that it saves billing a payer who's not going to pay, and it saves the payer rejecting the claim since it's never filed, and it saves the medical provider the delay in filing a claim with a health plan that will pay nothing.

Figure 17:
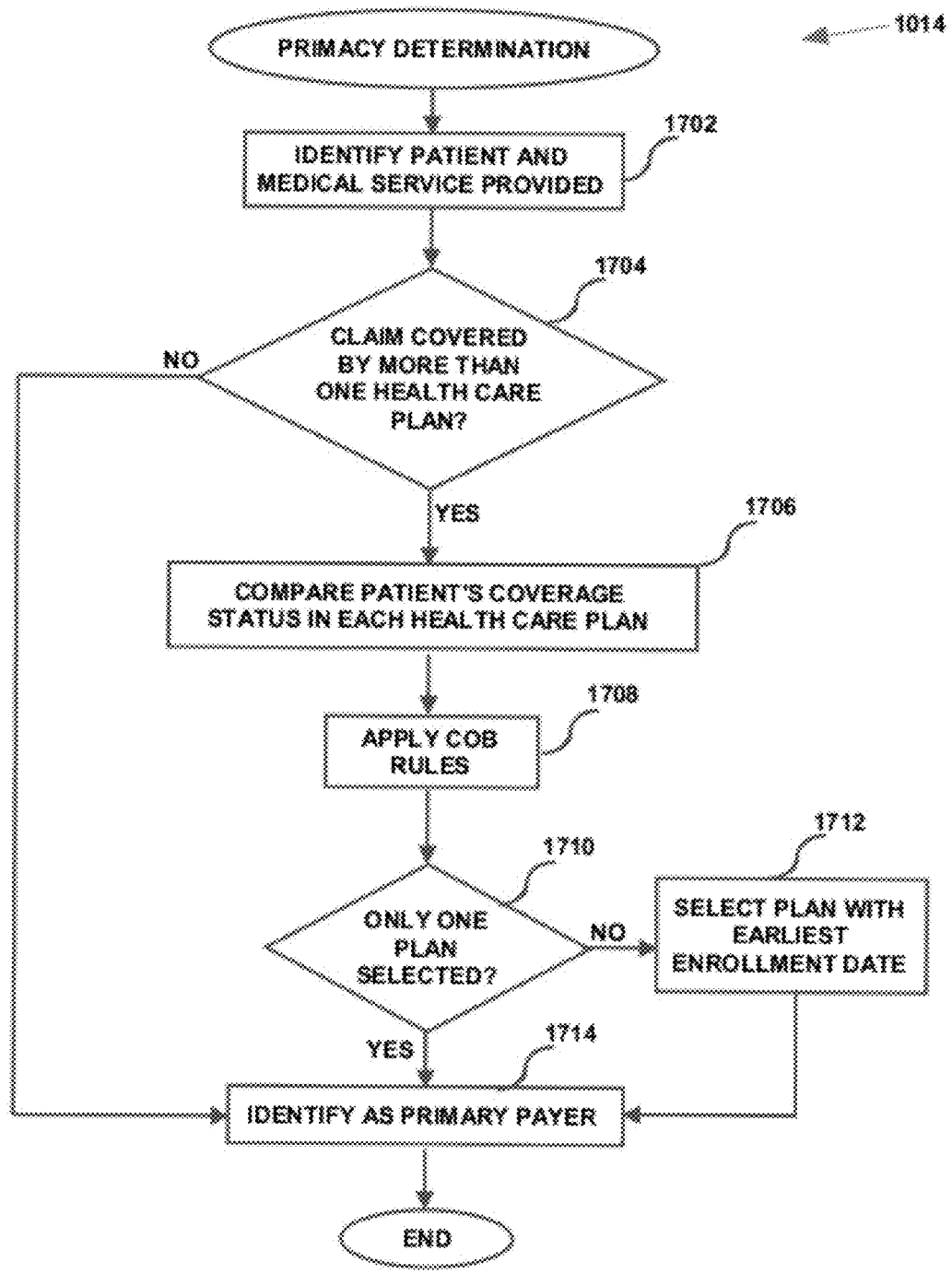
FIG. 17 is a logic flow diagram showing the determination of primacy including applying the rules engine of FIGS. 18A-J in accordance with the invention.

The logic flow diagram of FIG. 17 shows how the primary payer is determined when the patient is covered by two health plans. For instance, the patient might have coverage through her employer, and coverage as a spouse through her husband's employer. In step 1702, the patient and the needed medical service are identified. If it is found in 1704 that the patient has coverage for the medical service from only one plan that plan is identified in step 1704 as the primary payer and the process ends. However, if the patient is found in step 1704 to be covered by two health care plans, the patient's coverage status in each plan is determined in step 1706 and the (NAIC) National Association of Insurance Commissioners COB (Coordination of Benefit) rules are applied in step 1708. If in step 1710 it is determined that the COB rules appear to give primacy to neither of the two plans, the patient's enrollment dates for each plan are checked in step 1712 and the plan in which the patient was first enrolled is identified in step 1714 as the primary payer. If this rules application fails to resolve primacy, the system delivers the claim data to both health plans, with notice attached that Rule six must be adjusted between the health plans when the amount payable by each has been resolved internally. If, instead, the coverage status of one plan is given primacy in step 1710 by the COB rules, the plan selected by the COB rules is identified in step 1714 as the primary payer.

Verifying Patient Eligibility for Coverage

Logic flow diagram 19 illustrates a System process (part of step 810) of verifying eligibility for coverage of a specific medical service for a specific patient. The process seeks as much detail about a patient's eligibility for coverage by a specific health plan's coverage as is available, including the patient's needed medical service, the record of medical service rendered to the patient as recorded in the Master Claim History Database (222), payments made and any related limitations and exclusions of the health plan's coverage agreement with the patient.

Figure 10:
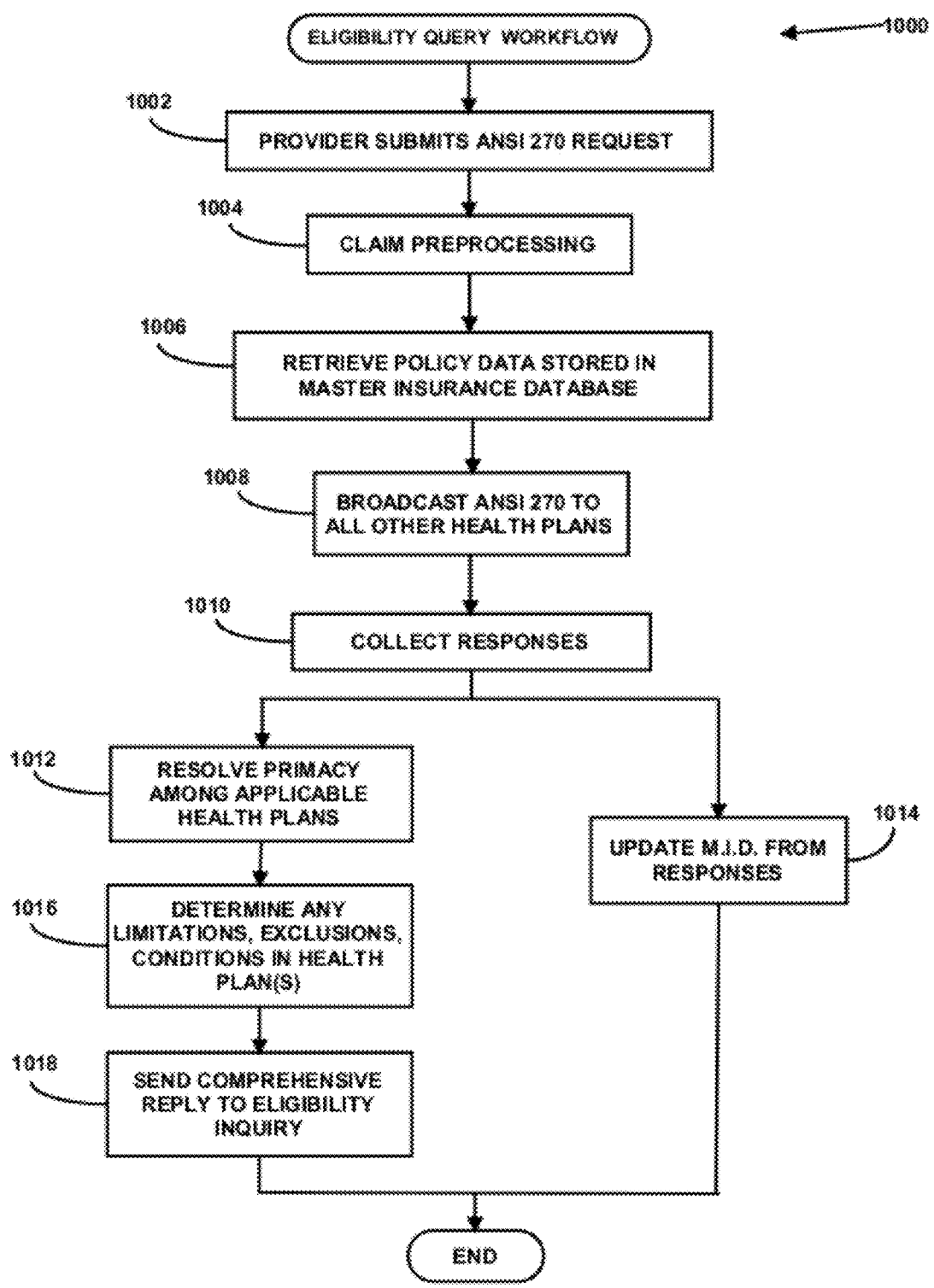
FIG. 10 is a logic flow diagram showing the process of sending and reporting on an eligibility query to heath plans in accordance with the invention.

Using the process described below in FIG. 10, the system, step 1902, sends and reports on an eligibility query aimed at both health plans whose data is resident on the system and plans whose data is not resident on the system. Next, the System determines in step 1904 whether the patient's eligibility for coverage by the subject health plan requires proof-of-need. A health plan may have a requirement that state or employer assistance is available only in the absence of employment or of other health coverage. This issue is accommodated by polling, through Database 212, sources of information on payroll records, such as tax authorities' databases.

The question of the patient's proof-of-need is resolved in step 1904 which employs the System process seen in Logic Flow Diagram 900, of determining proof-of-need when eligibility requires proof-of-need.

A health plan may have another class of proof-of-need requirement such as a test of "medical necessity" be passed, or that pre-certification of expensive or experimental care be pre-certified, etc. These proofs of need would be recorded and defined in detail in Master Insurance Database 216.

In addition to the insured, this process enables the policies of some health plans for dependents of an insured where dependents are covered only when they either have no other source of coverage. Since coverage itself is a condition of primacy, resolving these issues before enrollment, and testing its continued existence on each claim, is vital. In existing systems no means of searching efficiently for such issues exists.

The proof-of-need eligibility process decides in step 902 of logic flow diagram 900 whether the subject health plan requires proof-of-need for coverage of a patient's medical treatment. If not, the process ends. If, however, the subject health plan does require proof-of-need, the patient's need data is retrieved from MHPD 206 in step 904, and compared to the need-based eligibility requirements of the subject health plan in step 906.

If it is decided in step 906 that the patient is not eligible for need-based coverage, the System, in step 908, reports that there is no need based eligibility, stores the patient's need status in (Master Insurance Database) MID 216 in step 912 and the proof-of-need process ends. If, instead, the patient is found in step 906 to be eligible based on proof-of-need, the System, in step 910, returns a notification of need-based eligibility, then, in step 912, stores the patient's need status in MID 216, and the proof-of-need process ends.

If the patient's eligibility had been found to depend on proof-of-need, the System, in step 1904, would have searched the MHPD 206 and/or executed a test of employment to payroll tax data sources through MPD 212 to see whether proof-of-need was provided for the patient; if no proof of-need was found in the MHPD 206, the System, in step 1914, would have reported that the patient is ineligible for coverage.

But, had proof-of need been required and the patient found in step 1904 to have proof-of-need, or if proof of need was established by MPD 212, the process would then have moved to 1906, just as it would for the subject whose eligibility did not depend on proof-of-need. Step 1906 then determines by examining tables in MHPD 206 whether the medical service proposed for the patient is covered by the health plan's agreement with the patient. Some health plans might not, for example, include chiropractic services, and others refuse payment to out-of-panel medial providers. If such an exclusion exists, the patient or provider is reported in step 1914 to be ineligible for coverage by the health plan for the service specified. However, if the proposed medical service is covered by the health plan, the process moves to step 1908 where ICRL 204 searches the tables of Personal Health Plan Database (PHPD) 230 to determine whether there are any coverage limitations related either to the patient or to the service. Limitations can, for example, include number of patient visits in a year and total amount expended by the health plan for a particular service, data which is stored in PHPD 230. Such data can lead to rejection of a claim. If there are no exceeded plan limitations, the patient's eligibility is reported in 1912.

This process of verifying proof-of-need by the System enables, for example, the conscientious and rapid execution of healthcare reform in Massachusetts, where otherwise state employees would need to find other means of matching millions of eligible beneficiaries against employment and payroll records of tens of millions of employers. It also enables very rapid notice to medical providers of conditional or non-financial proofs of need such as medical necessity testing or pre-certification, which may not be understood by a patient, or which an unconscious or otherwise debilitated patient may not be able to recall. Storage in a central source also enables Medical Providers to advance their claims over these threshold issues more efficiently by pointing out to secondary health plans that Primary health plans had already executed similar processes, saving all parties time and money.

If there are limitations, and step 1910 determines from tables in MHPD 206 that those limits have not been reached for this patient, the eligibility verification process moves to step 1912, where the System reports the extent of the patient's eligibility. If, instead, the limits had already been reached, the System would have reported in step 1914 that the patient was not eligible for any payment at this time by the health plan for the subject medical service.

The Balance Billing Process

Logic flow diagram 1100, illustrates the process of billing health plans when a patient is covered by more than one payer. After the primary payer has been determined and billed, a billing response from the primary payer is received by the System in step 1102. If the billing response indicates that the bill will be paid in full by the primary payer, the System reports to the medical provider in step 1112 and creates audit data in 1114. However, if a balance will remain after the payment by the primary payer, the System looks for another payer in step 1106. If there is another payer, the System, in step 1108, sends the other payer a copy of the response of the primary payer and bills the payer accordingly. The process then returns to step 1102, and repeats, if a balance still remains and if there are more payers. When no other health plan payer is found in step 1108, the process moves to the net bill process of step 1110, where the System examines the possibility of payment by personal funds of any remaining balance. After step 1110, the System would generate a report of the balance billing process to the medical provider in step 1112 and create audit data in step 1114.

Payment with Personal Funds

The Net Bill process of 1110 is seen in logic flow diagram 1200, where all insurance resources for payment have been exhausted and yet a part of the bill remains unpaid. The process begins at step 1202 where it asks whether the use of personal funds of the patient or of another person has been authorized. If such use of sources have been authorized, the process moves to step 1204 where the net balance is billed to the authorized source of funds. This billing is then recorded in the (Master Claim History Database) MCHD 222 and MHPD 206 in step 1206, then reported to the medical provider in step 1208.

Monitoring and Enforcing Payments to Medical Providers

Prompt-Payment

Logic flow diagram 1300 shows the System's process of detecting and reporting late payment of claims, which, in some states, is a violation of their prompt-pay statutes. In step 1302, ICRL 204 compares the date each bill is submitted by the medical provider and acknowledged as received by a health plan to the date a remittance advice is received by the Medical Provider. ICRL 204 then searches Legal Regulations database 228 in step 1304 to see whether the state governing the transaction between the medical provider and the Health plan has a prompt-pay statute. If there is an applicable Prompt Pay Act, the system determines whether payment was timely made. If it was, the process ends, If it was not, the system calculates and bills the health Plan the statutory penalty, and reports such billed penalties to each respective Medical Provider and, if enforcement is or may be needed, the enforcement authority, and is stored in Master Claims Database 222.

If there is no applicable prompt-pay statute, the process moves to step 1310, where ICRL 204 searches Master Claims Database 222 to determine whether the contract between the medical provider and the health plan permits a late-payment penalty. If the contract does not allow the assessment of penalties for late payments, the process ends. But if the contract does allow assessment of penalties for late payment, the process moves to 1312 where ICRL 204 determines whether the payment was late according to the terms of the contractual agreement, and, if it was not late, the process ends. But if the payment was made later than the contract allows the process moves to step 1314, where the penalty is calculated and charged to the health plan, and if enforcement is or may be needed, the enforcement authority. The penalty is then reported in step 1316 and is stored in Master Claims Database 222.

If, however, in step 1304, it had been determined that there is, indeed, a prompt-pay statute, the process would have moved to step 1306 where ICRL 204 would determine whether the time interval between billing and payment exceeded the statutory limit. And, if the time interval had exceeded the statutory limit, the penalty would have been calculated and charged in step 1308, and the process would then have moved to step 1310 and followed the process described heretofore. Had the time interval between billing and payment not been found in step 1306 to have exceeded the statutory limit, the process would have moved directly to step 1310, then, from step 1310, would have followed the process described heretofore.

Full-Payment Enforcement

Figure 14:
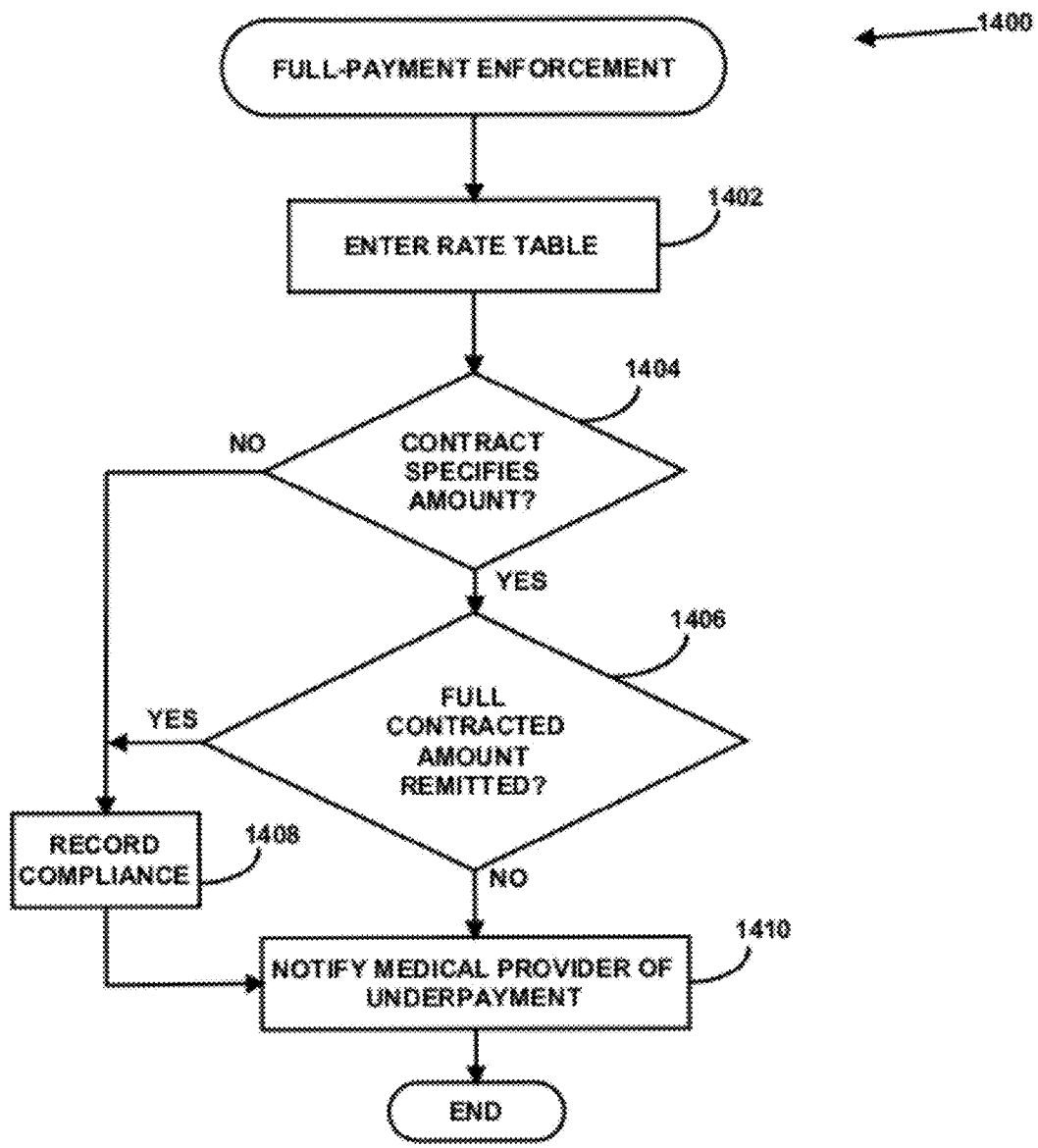
FIG. 14 is a logic flow diagram showing the full-payment enforcement process in which the amount of payment to providers agreed to in a contract is monitored and reported in accordance with the invention

Logic flow diagram 1400 (FIG. 14) shows the System's process of detecting and reporting payment of claim amounts that are less than contractual agreements. The medical provider enters, in step 1402, a table of payable rates agreed to by a given health plan. Then, the ICRL 204 compares, in step 1404, any remittance to the Provider from the health plan to the table of payable rates to see whether an amount was agreed upon for the service shown in the subject remittance. If the contract does not specify an amount for the service, the process ends. But if the contract does specify an amount for the service, the amount remitted is compared in step 1406 to the amount specified in the contract. If it is determined in step 1408 that the amount remitted is the amount specified in the contract, the process moves to step 1412 and records the health plan's contractual compliance in payment for the service. If the amount paid exceeds the contracted amount, the server notifies the health Plan of the apparent overpayment. If the amount remitted by the health plan is less than the amount specified for the service in the contract, the underpayment is recorded by the System in step 1410 and the medical provider is notified of the underpayment.

Banking within the System

Figure 15:
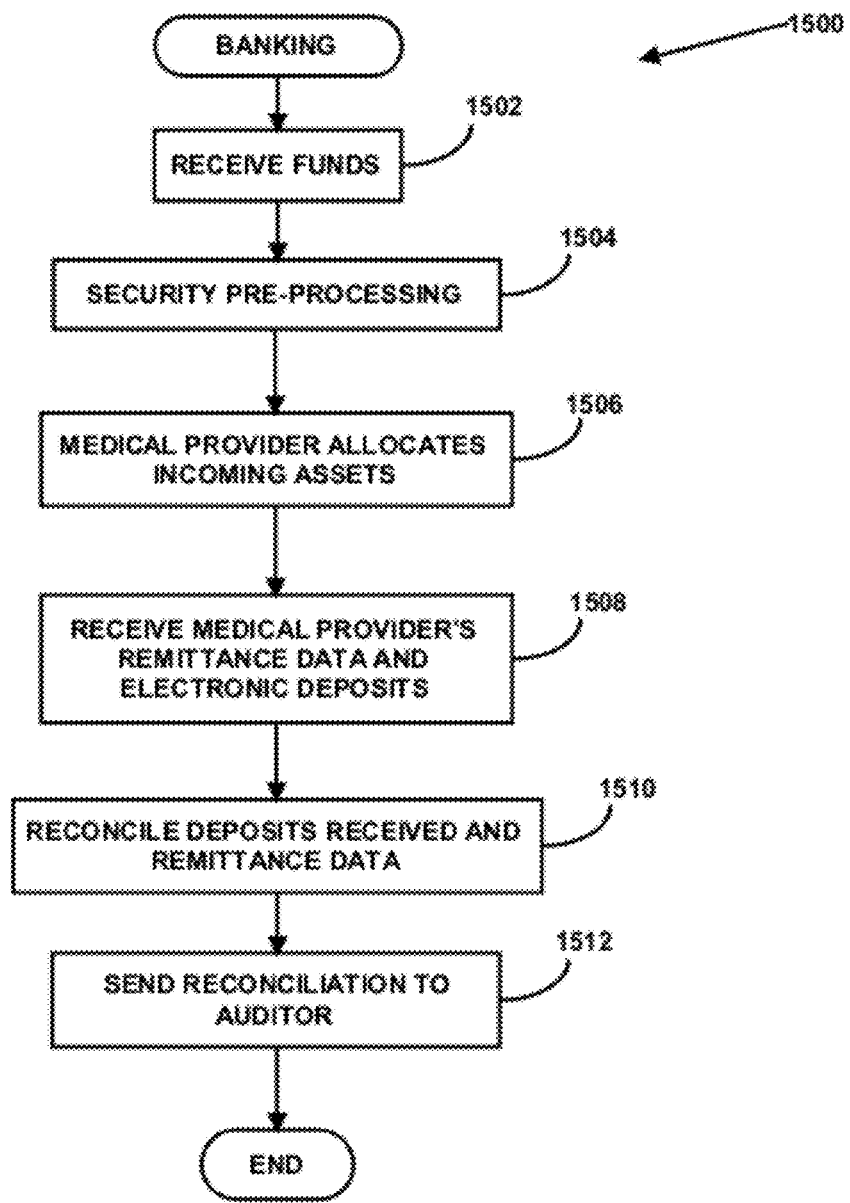
FIG. 15 is a logic flow diagram showing the banking process provided for users in accordance with the invention.

The preferred embodiment allows automated banking transactions within the system, which can eliminate the issuing and processing of billions of checks and (EFT) Electronic Funds Transfers. In an illustrative example of this process in the preferred embodiment, a Medical Provider establishes and monitors allocation accounts through a digital dashboard user interface provided by server 106A and instructs server 106A to allocate incoming claims payment assets for the servicing of its payroll, payables, debts and investments. The process receives both remittance advice from health plans and electronic funds transfers from health plans, and from credit and debit accounts, and medical savings accounts. As seen in logic diagram 1500 of FIG. 15, funds are received in 1502, at a separate, dedicated banking computer as electronic fund transfers or wire transfers. The cash management function is separated from the data transactions described above to preserve a proper audit trail. After security pre-processing in step 1504, the system, by reading the Medical Provider's instructions from the system's private network, allocates funds, in step 1506, to various financial products. At 1507, the process enables the Medical Provider to pay bills and allocate net deposits to accounts payable, payroll, investment accounts, and the like. The automated process then, in step 1508, receives Medical Provider's remittance data and record of funds deposited, and in step 1510, matches the alleged deposits seen in remittance responses to the actual funds received. And, in step 1512, the system sends a reconciliation to an auditor for resolution of any variances. The process includes the receipt of authorized check registers prepared by health plans for release, and the receipt of deposits by health plan Sponsors to cover the value of those check registers, resolving the distribution of cash to Medical Providers internally, without the issuance of a check or the sending of an (EFT). The automated process not only eliminates the issuance of a huge number of EFTs and checks, but also reduces significantly the overhead of auditing 18% of the gross domestic product of the United States.

System's Accounts Receivable

Figure 16:
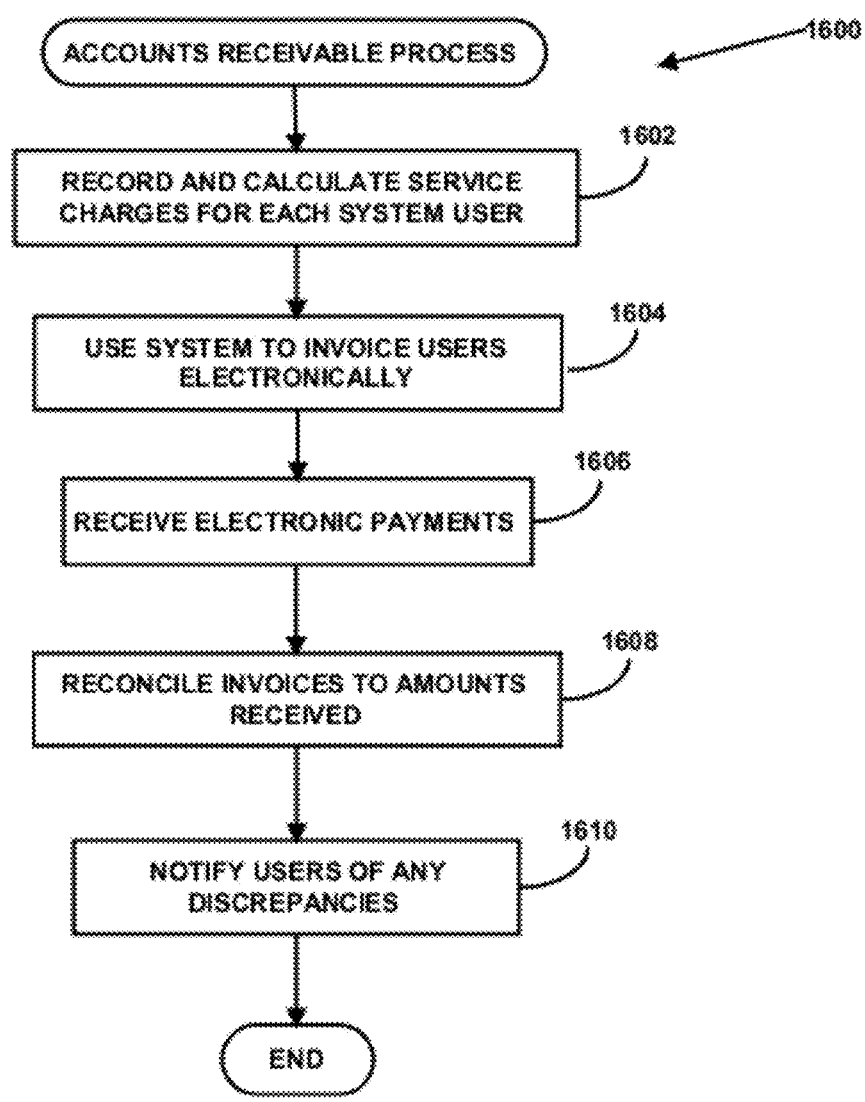
FIG. 16 is a logic flow diagram showing the accounts receivable process through which the system bills its users in accordance with the invention.

Logic flow diagram 1600 (FIG. 16) shows the process the system uses in the preferred embodiment to track charges and send invoices for use of the system. In step 1602 the system constantly records and calculates service charges for each use of the system. In step 1604 the system periodically invoices the users electronically. In step 106 the system receives electronic payments from users and, subsequently, in step 1608, reconciles the invoices with the amounts received.

CONCLUSION

The automated insurance claim resolution system realizes economies of scale, transparency in the healthcare finance process, reduced bookkeeping overhead, and better insurance fraud detection. The unity of these processes renders greater value to users than the collection of the separate parts. The licensee has engaged in extensive market research and established that many parties are interested in the specific cluster of services articulated here, and in fact that several such functions are, apart from this integration either impossible, impractical, or many times more expensive by hand or through current non-integrated software packages.

The above description is illustrative only and is not limiting. Instead, the present invention is defined solely by the claims which follow and their full range of equivalents.

What is claimed is:

1. A method for enabling industry-wide automated health insurance claim resolution processing, the method comprising:
    providing a server operable to receive and transmit electronic data, the server including a processor and a computer readable storage medium, the computer readable storage medium storing health coverage providers serving a given population;
    for each of all health coverage providers serving a given population, identifying, by the server, each as either (i) a participating health coverage provider that has agreed to provide health coverage information for storage in the computer readable storage medium or (ii) a non-participating health coverage provider that has agreed to respond to individual data queries regarding health coverage for specific individuals;
    from one or more of the participating health coverage providers, receiving, by the server, and storing on the computer readable storage medium health coverage information;
    receiving, by the server, a request for coverage information regarding a member of the given population for one or more medical services;
    determining, by the server, that one or more selected ones of the participating health coverage providers provides health care coverage for the member;
    retrieving, by the server, plan-specific health coverage information pertaining to the member from the computer readable storage medium for each of the selected participating health coverage providers;
    determining, by the server, that one or more selected ones of the non-participating health coverage providers provides health care coverage for the member;
    transmitting, by the server, a coverage query to each of the selected non-participating health coverage providers for information regarding coverage provided by the non-participating health coverage provider to the member;
    receiving, by the server, responsive plan-specific health coverage information from each of one or more of the selected non-participating health coverage providers; and
    from the retrieved plan-specific health coverage information and the responsive plan-specific health coverage information, determining, by the server, that a primary health coverage provider from among the selected health coverage providers has primary responsibility for coverage of the medical services, for each of the participating health coverage providers, identifying, by the server, the participating health coverage provider as either (i) a hosted participating health coverage provider or (ii) an unhosted participating health coverage provider, said unhosted participating health provider having a cach of enrollment data that can be reached by users of the system for each unhosted participating health coverage provider, periodically receiving, by the server, health coverage information for storage in the computer readable storage medium such that the computer readable storage medium stores all of the health coverage information for the unhosted participating health coverage provider for primacy determination for substantially all of the given population; and for each hosted participating health coverage provider, retaining the primary health coverage information in the computer readable storage medium and providing the hosted participating health coverage provider with administrative access to the primary health coverage information, determining the server that health coverage information from a failed one of the unhosted participating health coverage providers has not been received in a predetermined amount of time; and transmitting, by the server, coverage query to the failed unhosted participating health coverage provider for information regarding coverage provided by the nonparticipating health coverage provider to the member;

receiving, by the server, responsive plan-specific health coverage information from the failed unhosted participating health coverage provider;

including the responsive plan-specific health coverage information received from the failed unhosted participating health coverage provider in determining, by the server, that a primary health coverage provider from among the selected health coverage providers has primary responsibility for coverage of the medical services.

2. The method of claim 1 further comprising determining, by the server, that a failed one of the non-participating health coverage providers has not responded to a coverage query within a predetermined period of time.

3. The method of claim 2 further comprising reporting, by the server, the failed non-participating health coverage provider to an authority that is responsible for enforcing timely response to coverage queries.

4. The method of claim 1 wherein determining that a primary health coverage provider from among the selected health coverage providers has primary responsibility for coverage of the medical services comprises applying a rules engine, by the server, to the retrieved plan-specific health coverage information and the responsive plan-specific health coverage information.

\* \* \* \* \*